United States Patent
Jeong

(10) Patent No.: US 11,639,082 B2
(45) Date of Patent: May 2, 2023

(54) VEHICLE CLIMATE CONTROL SYSTEM AND METHOD FOR CONTROLLING THE SAME

(71) Applicants: Hyundai Motor Company, Seoul (KR); Kia Motors Corporation, Seoul (KR)

(72) Inventor: Seong Bin Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 398 days.

(21) Appl. No.: 16/943,141

(22) Filed: Jul. 30, 2020

(65) Prior Publication Data

US 2021/0170827 A1 Jun. 10, 2021

(30) Foreign Application Priority Data

Dec. 5, 2019 (KR) ........................ 10-2019-0160943

(51) Int. Cl.
*B60H 1/00* (2006.01)
*B60H 1/32* (2006.01)

(52) U.S. Cl.
CPC ..... *B60H 1/00285* (2013.01); *B60H 1/00485* (2013.01); *B60H 1/00807* (2013.01); *B60H 1/00885* (2013.01); *B60H 1/3223* (2013.01); *B60H 1/3227* (2013.01); *B60H 1/32281* (2019.05); *B60H 2001/3255* (2013.01)

(58) Field of Classification Search
CPC .............. B60H 1/3223; B60H 1/32281; B60H 1/00285; B60H 1/3227; B60H 1/00485; B60H 1/00885; B60H 1/00889; B60H 1/00807; B60H 1/3204; B60H 2001/00928; B60H 2001/3255; B60N 2/5614
See application file for complete search history.

(56) References Cited

U.S. PATENT DOCUMENTS 2,722,266 A * 11/1955 Kersten .................... B60N 2/60
62/448
3,738,702 A * 6/1973 Jacobs ................. B60N 2/5614
219/202

(Continued)

FOREIGN PATENT DOCUMENTS

CN 101554851 A * 10/2009 ........... B60N 2/5635
CN 101746302 A * 6/2010

(Continued)

*Primary Examiner* — Jenna M Hopkins
(74) *Attorney, Agent, or Firm* — Slater Matsil, LLP

(57) ABSTRACT

A vehicle climate control system includes an air conditioning unit including an exterior heat exchanger, an interior heat exchanger, an evaporator, a compressor, a first expansion valve, and a second expansion valve. A seat coil is embedded in a vehicle seat and connected to the air conditioning unit through a first inlet passage, a first outlet passage, a second inlet passage, and a second outlet passage. The compressor is selectively connected to the exterior heat exchanger, the evaporator, the interior heat exchanger, and the seat coil. The first expansion valve is selectively connected to an outlet of the exterior heat exchanger, an inlet of the evaporator, and the seat coil. The second expansion valve is selectively connected to an outlet of the interior heat exchanger, an inlet of the exterior heat exchanger, and the seat coil air conditioning unit.

5 Claims, 17 Drawing Sheets

(56) References Cited

U.S. PATENT DOCUMENTS

| | | | | |
|---|---|---|---|---|
| 5,138,851 A * | 8/1992 | Mardikian | ........... | B60N 2/5614 62/434 |
| 5,370,439 A * | 12/1994 | Lowe | ................... | B60N 2/5635 297/180.13 |
| 5,385,382 A * | 1/1995 | Single, II | ................. | A47C 7/74 297/180.13 |
| 5,613,729 A * | 3/1997 | Summer, Jr. | ......... | B60N 2/6054 297/180.13 |
| 5,613,730 A * | 3/1997 | Buie | ....................... | B60N 2/60 297/180.12 |
| 5,617,811 A * | 4/1997 | Johnson | ............... | B60N 2/5614 440/89 C |
| 5,715,695 A * | 2/1998 | Lord | .................. | B60H 1/00285 62/331 |
| 5,996,360 A * | 12/1999 | Tanaka | .................. | F25B 43/006 62/509 |
| 6,254,179 B1 * | 7/2001 | Kortum | ............. | B60H 1/00285 297/180.12 |
| 6,347,528 B1 * | 2/2002 | Iritani | .................. | B60H 1/3207 62/434 |
| 7,264,046 B1 * | 9/2007 | Futernik | ............. | B60H 1/00435 62/236 |
| 7,950,735 B2 * | 5/2011 | Major | .................. | B60N 2/5635 297/180.14 |
| 8,015,835 B2 * | 9/2011 | Lee | .................... | B60H 1/00285 62/200 |
| 8,136,874 B2 * | 3/2012 | Negrini | ................ | B60N 2/5692 297/180.11 |
| 8,678,492 B2 * | 3/2014 | Benton | ................ | B60N 2/5692 297/180.14 |
| 10,293,660 B2 * | 5/2019 | Ohishi | .................... | F25B 41/24 |
| 11,161,436 B1 * | 11/2021 | Graham | ............... | B60N 2/5614 |
| 11,267,318 B2 * | 3/2022 | He | .................... | B60H 1/00907 |
| 11,346,583 B2 * | 5/2022 | Wallis | ..................... | F25B 41/39 |
| 11,370,271 B2 * | 6/2022 | Durrani | ................. | F25B 40/00 |
| 2006/0059933 A1 * | 3/2006 | Axakov | .................. | F25B 15/04 62/476 |
| 2008/0085672 A1 * | 4/2008 | Creed | .................... | B60H 1/032 165/104.11 |
| 2009/0193827 A1 * | 8/2009 | Lee | ......................... | B60H 1/323 62/190 |
| 2009/0250980 A1 * | 10/2009 | Major | ................... | B60N 2/5692 297/180.15 |
| 2010/0301642 A1 * | 12/2010 | Negrini | ................ | B60N 2/5692 297/180.11 |
| 2012/0079837 A1 * | 4/2012 | Maranville | ........... | B60N 2/5692 62/3.61 |
| 2015/0027143 A1 * | 1/2015 | Nemesh | ............... | B60H 1/00921 62/115 |
| 2020/0039323 A1 * | 2/2020 | He | ...................... | B60H 1/00914 |
| 2020/0398645 A1 * | 12/2020 | He | ......................... | F25B 41/26 |
| 2021/0155078 A1 * | 5/2021 | He | ..................... | B60H 1/00021 |
| 2021/0170827 A1 * | 6/2021 | Jeong | ................. | B60H 1/32281 |
| 2022/0026123 A1 * | 1/2022 | Perkovich | ............ | B60H 1/3232 |

FOREIGN PATENT DOCUMENTS

| | | | | |
|---|---|---|---|---|
| CN | 104943508 A | * | 9/2015 | ......... B60H 1/00285 |
| CN | 204749798 U | * | 11/2015 | |
| CN | 207523396 U | * | 6/2018 | ......... B60H 1/00285 |
| CN | 108790985 A | * | 11/2018 | ......... B60N 2/5614 |
| CN | 109318678 A | * | 2/2019 | ......... B60H 1/00007 |
| CN | 108790985 B | * | 5/2019 | ........... B60N 2/5614 |
| DE | 10002286 A1 | * | 7/2001 | ......... B60H 1/00285 |
| FR | 1093716 A | * | 5/1955 | ............... B60N 2/38 |
| FR | 2782788 A1 | * | 3/2000 | ................. A47C 7/74 |
| GB | 2278432 A | * | 11/1994 | ......... B60H 1/00285 |
| JP | 2008030521 A | * | 2/2008 | ......... B60H 1/00285 |
| JP | 2016037122 A | * | 3/2016 | |
| KR | 20040015599 A | * | 2/2004 | ......... B60H 1/00285 |
| KR | 100868961 B1 | | 11/2008 | |
| KR | 20120041861 A | | 5/2012 | |
| KR | 20120088042 A | | 8/2012 | |
| KR | 20210070789 A | * | 6/2021 | |
| WO | WO-0012948 A1 | * | 3/2000 | ................. A47C 7/74 |
| WO | WO-2010008158 A1 | * | 1/2010 | ......... B60H 1/00285 |
| WO | WO-2016136382 A1 | * | 9/2016 | ......... B60H 1/00385 |
| WO | WO-2017010289 A1 | * | 1/2017 | ......... B60H 1/00907 |
| WO | WO-2019106585 A1 | * | 6/2019 | ......... B60H 1/00285 |

* cited by examiner

VEHICLE CLIMATE CONTROL SYSTEM AND METHOD FOR CONTROLLING THE SAME

CROSS-REFERENCE TO RELATED APPLICATIONS

This application claims priority to Korean Patent Application No. 10-2019-0160943, filed in the Korean Intellectual Property Office on Dec. 5, 2019, which application is hereby incorporated herein by reference.

TECHNICAL FIELD

The present disclosure relates to a vehicle climate control system and a method for controlling the same.

BACKGROUND

When a consumer selects a vehicle, fuel efficiency of vehicles/energy efficiency of electric vehicles is a very important criterion. Accordingly, vehicle makers are researching and developing technologies to improve fuel efficiency/energy efficiency.

All electric range (AER), which is the driving range of an electric vehicle on a single charge, is a very important factor. However, when the electric vehicle is driving, 20 to 30% of electrical energy per charge is consumed by cooling, heating, etc., so the actual driving range falls exponentially.

Some vehicles have a heating, ventilation & air conditioning (HVAC) system for heating or cooling the air in the passenger compartment and a seat air-conditioning system for cooling or heating the seat.

In an existing HVAC system, the quantity of heat for cooling or heating to reach a target temperature from a measured room temperature of the passenger compartment is calculated by a controller, a duct discharge temperature of the HVAC system is determined according to the calculated heat quantity, and a compressor of the HVAC system operates accordingly.

As an existing seat air-conditioning system is equipped with a plurality of additional components such as a blower, a thermoelectric element, a duct, and a heating wire inside the seat, its manufacturing cost increases. The existing seat air-conditioning system allows a user to manually adjust a temperature of the seat step by step, and basically, it has low energy efficiency.

According to the related art, the HVAC system and the seat air-conditioning system are separated from each other. As the HVAC system and the seat air-conditioning system operate independently of each other, it is difficult to control an occupant's desired optimum temperature and efficiently manage the vehicle's energy. In addition, heating and cooling efficiency of each system is lowered.

The above information described in this background section is provided to assist in understanding the background of the inventive concept, and may include any technical concept which is not considered as the prior art that is already known to those skilled in the art.

SUMMARY

The present disclosure relates to a vehicle climate control system and a method for controlling the same. Particular embodiments relate to a vehicle climate control system and a method for controlling the same, providing efficient thermal management with respect to a passenger compartment and vehicle seats.

Embodiments of the present disclosure can solve problems occurring in the prior art while advantages achieved by the prior art are maintained intact.

An embodiment of the present disclosure provides a vehicle climate control system and a method for controlling the same, providing efficient thermal management with respect to a passenger compartment and vehicle seats, thereby allowing an occupant to easily adjust a desired optimum temperature and efficiently managing the vehicle's energy.

According to an embodiment of the present disclosure, a vehicle climate control system may include an air conditioning unit (or air conditioning circuit) including an exterior heat exchanger, an interior heat exchanger, an evaporator, a compressor, a first expansion valve, and a second expansion valve, and a seat coil embedded in a vehicle seat, and connected to the air conditioning unit through a first inlet passage, a first outlet passage, a second inlet passage, and a second outlet passage, wherein the compressor may be selectively connected to the exterior heat exchanger, the evaporator, the interior heat exchanger, and the seat coil, the first expansion valve may be selectively connected to an outlet of the exterior heat exchanger, an inlet of the evaporator, and the seat coil, and the second expansion valve may be selectively connected to an outlet of the interior heat exchanger, an inlet of the exterior heat exchanger, and the seat coil.

The compressor may include a first inlet selectively connected to the outlet of the exterior heat exchanger and the seat coil, a second inlet connected to an outlet of the evaporator, and an outlet selectively connected to an inlet of the interior heat exchanger and the seat coil.

The vehicle climate control system may further include a first three-way valve selectively connecting the outlet of the exterior heat exchanger, the first inlet of the compressor, and the first expansion valve, a second three-way valve selectively connecting the first expansion valve, the inlet of the evaporator, and the seat coil, a third three-way valve selectively connecting the outlet of the compressor, the inlet of the interior heat exchanger, and the seat coil, and a fourth three-way valve selectively connecting the outlet of the interior heat exchanger, the seat coil, the inlet of the exterior heat exchanger, and the second expansion valve.

The first inlet passage may allow a refrigerant to flow from the outlet of the exterior heat exchanger to the seat coil, the first outlet passage may allow the refrigerant to flow from the seat coil to the first inlet of the compressor, the second inlet passage may allow the refrigerant to flow from the outlet of the compressor to the seat coil, and the second outlet passage may allow the refrigerant to flow from the seat coil to the inlet of the exterior heat exchanger.

The seat coil may include a first seat coil embedded in a seat cushion of the vehicle seat, and a second seat coil embedded in a seat back of the vehicle seat, and the first seat coil and the second seat coil may be fluidly connected to each other.

According to another embodiment of the present disclosure, a vehicle climate control system may include an air conditioning unit including an exterior heat exchanger, an interior heat exchanger, a compressor, an expansion valve, and a reversing valve which changes a direction of flow of a refrigerant, and a seat coil embedded in a vehicle seat, and connected to the air conditioning unit through a first passage and a second passage, wherein the reversing valve may be configured to connect the exterior heat exchanger, the interior heat exchanger, and the compressor, the first passage may be connected to a passage connecting between the reversing valve and the interior heat exchanger, and the second passage may be connected to a passage connecting between the expansion valve and the interior heat exchanger.

The reversing valve may include a first port connected to the exterior heat exchanger, a second port connected to an inlet of the compressor, a third port connected to an outlet of the compressor, and a fourth port connected to the interior heat exchanger and the seat coil.

The reversing valve may move between a first position in which a cooling operation of the air conditioning unit and/or a cooling operation of the seat coil is performed and a second position in which a heating operation of the air conditioning unit and/or a heating operation of the seat coil is performed.

The first position may be a position in which the first port and the third port communicate, and the second port and the fourth port communicate, and the second position may be a position in which the first port and the second port communicate, and the third port and the fourth port communicate.

The second passage of the seat coil and the interior heat exchanger may be connected to the exterior heat exchanger through a three-way valve.

The three-way valve may be configured to selectively connect the expansion valve, the interior heat exchanger, and the second passage of the seat coil.

According to another embodiment of the present disclosure, a method for controlling a vehicle climate control system may include determining whether or not a first target temperature corresponding to a target temperature of the air conditioning unit has been set, determining whether or not a second target temperature corresponding to a target temperature of the vehicle seat has been set, comparing the first target temperature with a room temperature when the first target temperature has been set, and selectively performing a cooling or heating operation of the air conditioning unit, and comparing the second target temperature with the room temperature when the second target temperature has been set, and selectively performing a cooling or heating operation of the vehicle seat.

The cooling operation of the air conditioning unit may be performed when the first target temperature is lower than the room temperature, and the heating operation of the air conditioning unit may be performed when the first target temperature is higher than or equal to the room temperature.

The cooling operation of the vehicle seat may be performed when the second target temperature is lower than the room temperature, and the heating operation of the vehicle seat may be performed when the second target temperature is higher than or equal to the room temperature.

When the cooling operation of the air conditioning unit and/or the cooling operation of the vehicle seat are performed, the following operations may be performed: calculating a first heat absorption quantity on the basis of the first target temperature, calculating a second heat absorption quantity on the basis of the second target temperature, calculating a corrected heat quantity which is a difference between the first heat absorption quantity and the second heat absorption quantity, determining a temperature of air discharged to a passenger compartment on the basis of the corrected heat quantity, determining a temperature required for evaporation of a refrigerant circulating in the air conditioning unit on the basis of the determined air temperature, determining a temperature of the vehicle seat on the basis of the second heat absorption quantity, and determining RPM of the compressor on the basis of the determined temperature required for evaporation of the refrigerant and the determined temperature of the vehicle seat.

When the heating operation of the air conditioning unit and/or the heating operation of the vehicle seat are performed, the following operations may be performed: calculating a first heat release quantity on the basis of the first target temperature, calculating a second heat release quantity on the basis of the second target temperature, calculating a corrected heat quantity which is a difference between the first heat release quantity and the second heat release quantity, determining a temperature of air discharged to a passenger compartment on the basis of the corrected heat quantity, determining a temperature required for condensation of a refrigerant circulating in the air conditioning unit on the basis of the determined air temperature, determining a temperature of the vehicle seat on the basis of the second heat release quantity, and determining RPM of the compressor on the basis of the determined temperature required for condensation of the refrigerant and the determined temperature of the vehicle seat.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
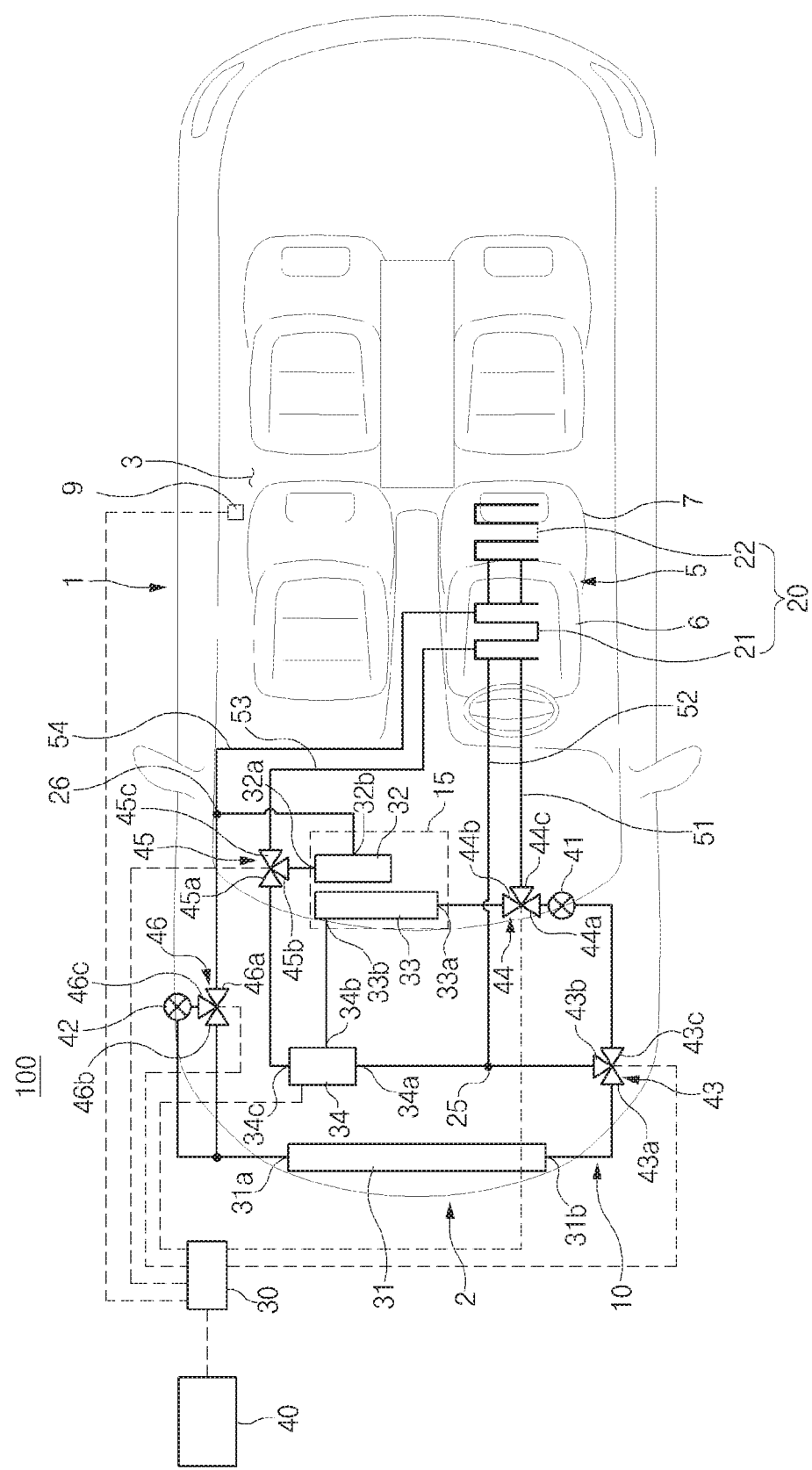
FIG. 1 illustrates a vehicle climate control system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle climate control system 100 according to an exemplary embodiment of the present disclosure may include an air conditioning unit 10 which conditions air flowing into a passenger compartment 3 of a vehicle 1 and a seat coil 20 which is fluidly connected to the air conditioning unit 10, and a refrigerant circulating in the air conditioning unit 10 may selectively circulate in the seat coil 20.

The air conditioning unit 10 may include a heat pump including an exterior heat exchanger 31, an interior heat exchanger 32, an evaporator 33, a compressor 34, a first expansion valve 41, and a second expansion valve 42.

The exterior heat exchanger 31 may be adjacent to a front end 2 of the vehicle 1, and the exterior heat exchanger 31 may have a refrigerant coil (a refrigerant passage) through which the refrigerant passes. An inlet 31a of the exterior heat exchanger 31 may be selectively connected to the interior heat exchanger 32, the seat coil 20 and the second expansion valve 42. An outlet 31b of the exterior heat exchanger 31 may be selectively connected to the compressor 34 and the first expansion valve 41.

The interior heat exchanger 32 and the evaporator 33 may be received in an air conditioning duct 15, and the air conditioning duct 15 may control the flow of the air into the passenger compartment 3. As the air is heated or cooled by the interior heat exchanger 32 and the evaporator 33 located within the air conditioning duct 15, the temperature, humidity, and the like of the passenger compartment 3 may be adjusted. The air conditioning duct 15 may have an air mixing door (also referred to as "temperature door") disposed between the interior heat exchanger 32 and the evaporator 33. The evaporator 33 may be disposed on the upstream of the air mixing door, and the interior heat exchanger 32 may be disposed on the downstream of the air mixing door. The air mixing door may control the air flow passing through the interior heat exchanger 32, thereby adjusting the temperature of the air flowing into the passenger compartment.

An inlet 32a of the interior heat exchanger 32 may be selectively connected to an outlet 34c of the compressor 34, and an outlet 32b of the interior heat exchanger 32 may be selectively connected to the inlet 31a of the exterior heat exchanger 31 and the second expansion valve 42. The interior heat exchanger 32 may have a refrigerant coil (a refrigerant passage) through which the refrigerant passes.

An inlet 33a of the evaporator 33 may be selectively connected to the first expansion valve 41, and an outlet 33b of the evaporator 33 may be directly connected to a second inlet 34b of the compressor 34. The evaporator 33 may have a refrigerant coil (a refrigerant passage) through which the refrigerant passes.

The compressor 34 may be selectively connected to the exterior heat exchanger 31, the interior heat exchanger 32, the evaporator 33, and the seat coil 20. In particular, the compressor 34 may include a first inlet 34a selectively connected to the outlet 31b of the exterior heat exchanger 31 and the seat coil 20, the second inlet 34b directly connected to the outlet 33b of the evaporator 33, and the outlet 34c selectively connected to the inlet 32a of the interior heat exchanger 32 and the seat coil 20.

The first expansion valve 41 may be located on the downstream of the exterior heat exchanger 31, and the first expansion valve 41 may be selectively connected to the outlet 31b of the exterior heat exchanger 31, the inlet 33a of the evaporator 33, and the seat coil 20 through a first three-way valve 43 and a second three-way valve 44 to be described below. As the refrigerant discharged from the exterior heat exchanger 31 passes through the first expansion valve 41, the pressure of the refrigerant may be reduced. For example, the first expansion valve 41 may be a thermal expansion valve.

The second expansion valve 42 may be located on the downstream of the interior heat exchanger 32, and the second expansion valve 42 may be selectively connected to the outlet 32b of the interior heat exchanger 32, the inlet 31a of the exterior heat exchanger 31, and the seat coil 20 through a third three-way valve 45 and a fourth three-way valve 46 to be described below. As the refrigerant discharged from the seat coil 20 and/or the interior heat exchanger 32 passes through the second expansion valve 42, the pressure of the refrigerant may be reduced. For example, the second expansion valve 42 may be a thermal expansion valve.

The first three-way valve 43 may include a first port 43a connected to the outlet 31b of the exterior heat exchanger 31, a second port 43b connected to the first inlet 34a of the compressor 34, and a third port 43c connected to the first expansion valve 41. The first three-way valve 43 may selectively open and close three ports 43a, 43b, and 43c, so that the first three-way valve 43 may selectively connect the outlet 31b of the exterior heat exchanger 31, the first inlet 34a of the compressor 34, and the first expansion valve 41.

For example, the first three-way valve 43 may be a valve having an electrically controlled actuator.

The second three-way valve 44 may include a first port 44a connected to the first expansion valve 41, a second port 44b connected to the inlet 33a of the evaporator 33, and a third port 44c connected to the seat coil 20. The second three-way valve 44 may selectively open and close three ports 44a, 44b, and 44c, so that the second three-way valve 44 may selectively connect the first expansion valve 41, the inlet 33a of the evaporator 33, and the seat coil 20. For example, the second three-way valve 44 may be a valve having an electrically controlled actuator.

The third three-way valve 45 may include a first port 45a connected to the outlet 34c of the compressor 34, a second port 45b connected to the inlet 32a of the interior heat exchanger 32, and a third port 45c connected to the seat coil 20. The third three-way valve 45 may selectively open and close three ports 45a, 45b, and 45c, so that the third three-way valve 45 may selectively connect the outlet 34c of the compressor 34, the inlet 32a of the interior heat exchanger 32, and the seat coil 20. For example, the third three-way valve 45 may be a valve having an electrically controlled actuator.

The fourth three-way valve 46 may include a first port 46a connected to the outlet 32b of the interior heat exchanger 32 and the seat coil 20, a second port 46b connected to the inlet 31a of the exterior heat exchanger 31, and a third port 46c connected to the second expansion valve 42. The fourth three-way valve 46 may selectively open and close the three ports 46a, 46b, and 46c, so that the fourth three-way valve 46 may selectively connect the outlet 32b of the interior heat exchanger 32, the seat coil 20, the inlet 31a of the exterior heat exchanger 31, and the second expansion valve 42. For example, the fourth three-way valve 46 may be a valve having an electrically controlled actuator.

The seat coil 20 may be embedded in a vehicle seat 5 to allow the circulation of the refrigerant. The seat coil 20 may include a first seat coil 21 embedded in a seat cushion 6 of the vehicle seat 5, and a second seat coil 22 embedded in a seat back 7 of the vehicle seat 5. The first seat coil 21 and the second seat coil 22 may be fluidly connected to each other.

The seat coil 20 may be fluidly connected to the air conditioning unit 10 through a first inlet passage 51, a first outlet passage 52, a second inlet passage 53, and a second outlet passage 54.

The first inlet passage 51 may allow the refrigerant to flow from the outlet 31b of the exterior heat exchanger 31 to the seat coil 20. In particular, the first inlet passage 51 may be directly connected to the third port 44c of the second three-way valve 44.

The first outlet passage 52 may allow the refrigerant to flow from the seat coil 20 to the first inlet 34a of the compressor 34. In particular, the first outlet passage 52 may be connected to a junction point 25 of a passage connecting between the second port 43b of the first three-way valve 43 and the first inlet 34a of the compressor 34.

The second inlet passage 53 may allow the refrigerant to flow from the outlet 34c of the compressor 34 to the seat coil 20. In particular, the second inlet passage 53 may be directly connected to the third port 45c of the third three-way valve 45.

The second outlet passage 54 may allow the refrigerant to flow from the seat coil 20 to the inlet 31a of the exterior heat exchanger 31. In particular, the second outlet passage 54 may be connected to a junction point 26 of a passage connecting between the outlet 32b of the interior heat exchanger 32 and the first port 46a of the fourth three-way valve 46.

A controller 30 may control the operation of the compressor 34, the operation of the first three-way valve 43, the operation of the second three-way valve 44, the operation of the third three-way valve 45, and the operation of the fourth three-way valve 46.

The controller 30 may be a vehicle controller such as an electronic control unit (ECU). The controller 30 may include a processor and a memory. The processor may receive instructions stored in the memory, and be programmed to transmit instructions to the compressor 34, the first three-way valve 43, the second three-way valve 44, the third three-way valve 45, and the fourth three-way valve 46. The memory may be a data store such as a hard disk drive, a solid state drive, a server, a volatile storage medium, or a non-volatile storage medium.

A user interface 40 may be electrically connected to the controller 30. The user interface 40 may have various input means, such as a switch, a button, a knob, and a touch screen, for the cooling operation of the air conditioning unit 10, the heating operation of the air conditioning unit 10, the cooling operation of the vehicle seat 5, the heating operation of the vehicle seat 5, target temperature setting of the air conditioning unit 10, and target temperature setting of the vehicle seat 5.

Figure 2:
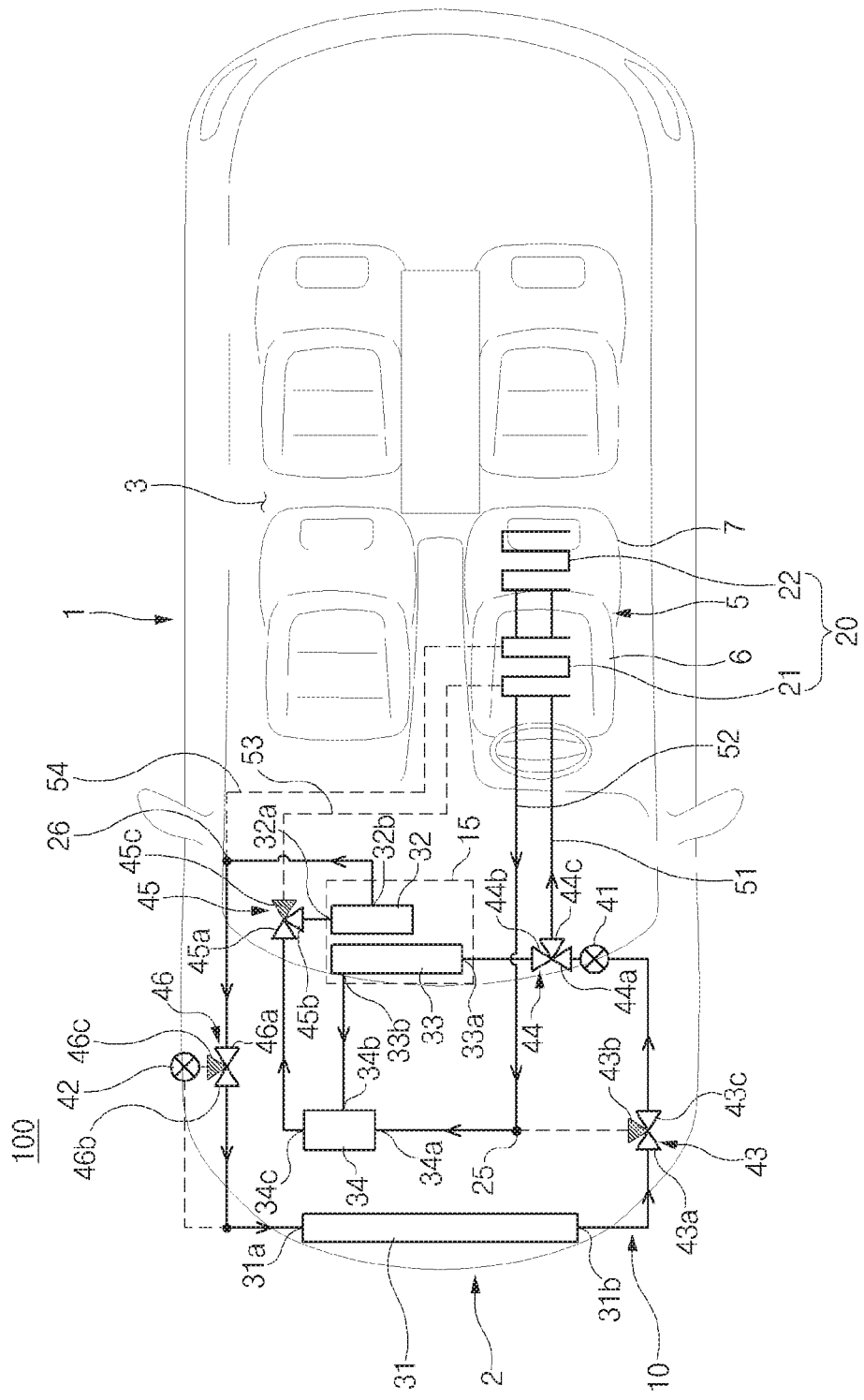
FIG. 2 illustrates a first mode of a vehicle climate control system according to an exemplary embodiment of the present disclosure.

FIG. 2 illustrates a first mode in which the cooling operation of the air conditioning unit 10 and the cooling operation of the vehicle seat 5 are performed together. That is, in the first mode, the passenger compartment 3 and the vehicle seat 5 may be cooled together.

Referring to FIG. 2, as the second port 43b of the first three-way valve 43 is closed, and the first port 43a and the third port 43c of the first three-way valve 43 are opened, the refrigerant may flow from the exterior heat exchanger 31 to the first expansion valve 41. As the refrigerant is expanded in the first expansion valve 41, the pressure of the refrigerant may be reduced. As the first port 44a, the second port 44b, and the third port 44c of the second three-way valve 44 are all opened, the refrigerant decompressed by the first expansion valve 41 may be distributed by the second three-way valve 44 and flow into the seat coil 20 and the evaporator 33. That is, some refrigerant may flow into the seat coil 20 through the first inlet passage 51, and the rest of the refrigerant may flow into the evaporator 33. As some refrigerant passes through the seat coil 20, it may absorb heat from the vehicle seat 5 and evaporate, and thus the vehicle seat 5 may be cooled. As the rest of the refrigerant passes through the refrigerant coil (the refrigerant passage) of the evaporator 33, it may absorb heat from the surroundings and evaporate, thereby lowering the temperature of the air passing through the evaporator 33. When the air passing through the evaporator 33 is discharged into the passenger compartment 3 through the air conditioning duct 15, the passenger compartment 3 may be cooled. Some refrigerant may flow from the seat coil 20 to the first inlet 34a of the compressor 34, and the rest of the refrigerant may flow from the evaporator 33 to the second inlet 34b of the compressor 34, so that the refrigerant may be compressed by the compressor 34. As the first port 45a and the second port 45b of the third three-way valve 45 are opened, and the third port 45c of the third three-way valve 45 is closed, the refrigerant compressed by the compressor 34 may pass through the refrigerant coil (the refrigerant passage) of the interior heat exchanger 32. While passing through the refrigerant coil (the refrigerant passage) of the interior heat exchanger 32, the refrigerant may release heat to the surroundings and condense. As the first port 46a and the second port 46b of the fourth three-way valve 46 are opened, and the third port 46c of the fourth three-way valve 46 is closed, the refrigerant may flow from the interior heat exchanger 32 to the exterior heat exchanger 31. Here, while passing through the refrigerant coil (the refrigerant passage) of the exterior heat exchanger 31, the refrigerant may release heat to the surroundings and condense.

In the first mode, the seat coil 20 and the evaporator 33 may serve as an evaporator, and the interior heat exchanger 32 and the exterior heat exchanger 31 may serve as a condenser. In particular, the refrigerant may sequentially pass through the interior heat exchanger 32 and the exterior heat exchanger 31 in the first mode so that the refrigerant may be primarily condensed by the interior heat exchanger 32, and be secondarily condensed by the exterior heat exchanger 31. That is, the refrigerant may be condensed in two stages, and thus the condensation efficiency of the refrigerant may be significantly improved.

Figure 3:
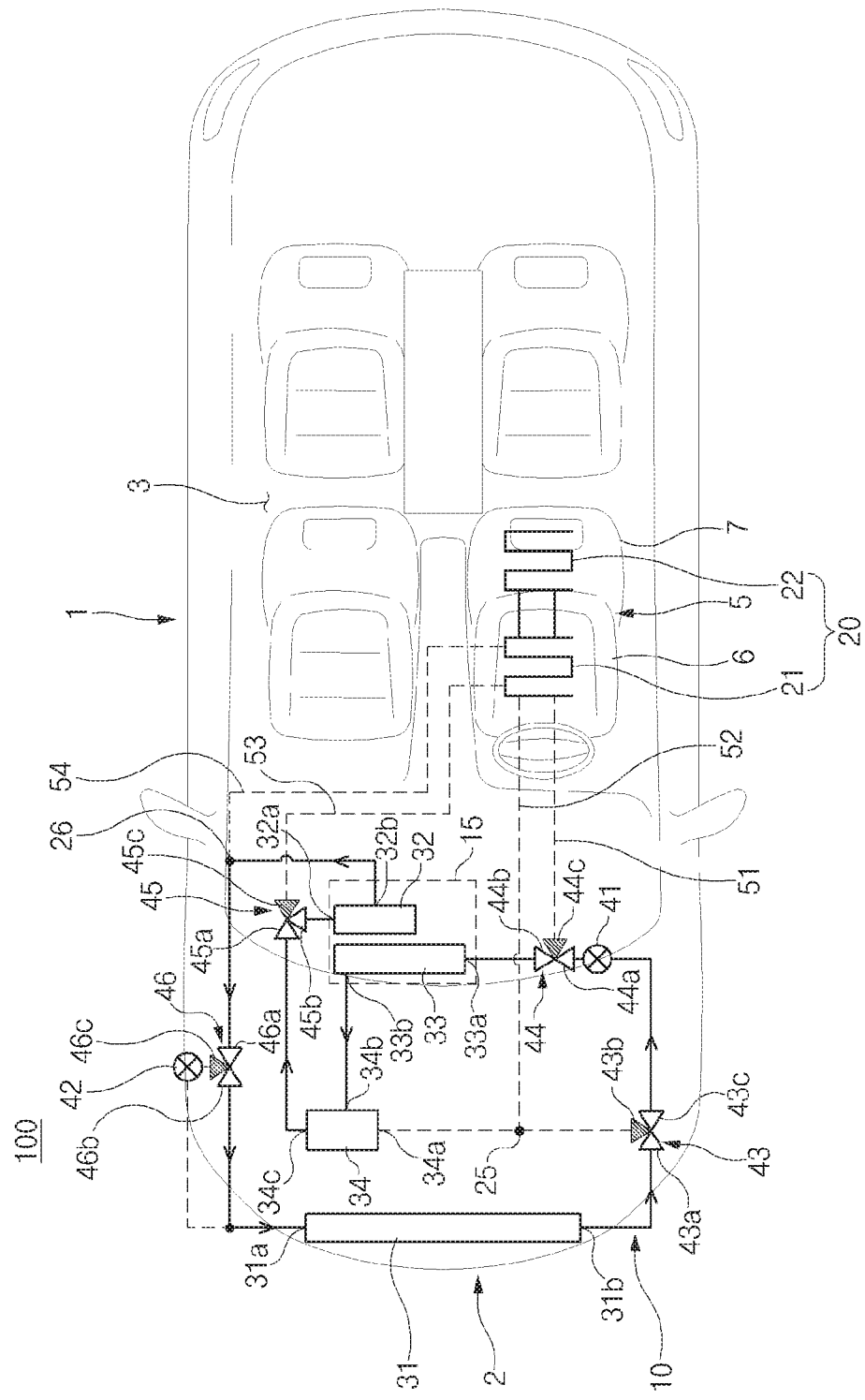
FIG. 3 illustrates a second mode of a vehicle climate control system according to an exemplary embodiment of the present disclosure.

FIG. 3 illustrates a second mode in which only the cooling operation of the air conditioning unit 10 is performed. That is, in the second mode, only the passenger compartment 3 may be cooled.

Referring to FIG. 3, as the second port 43b of the first three-way valve 43 is closed, and the first port 43a and the third port 43c of the first three-way valve 43 are opened, the refrigerant may flow from the exterior heat exchanger 31 to the first expansion valve 41. Here, the pressure of the refrigerant may be reduced by the first expansion valve 41. As the first port 44a and the second port 44b of the second three-way valve 44 are opened, and the third port 44c of the second three-way valve 44 is closed, the inlet 33a of the evaporator 33 may be opened, and the first inlet passage 51 of the seat coil 20 may be blocked. The refrigerant may only flow into the evaporator 33 without flowing into the seat coil 20. As the refrigerant passes through the refrigerant coil (the refrigerant passage) of the evaporator 33, it may absorb heat from the surroundings and evaporate, thereby lowering the temperature of the air passing through the evaporator 33. When the air passing through the evaporator 33 is discharged into the passenger compartment 3 through the air conditioning duct 15, the passenger compartment 3 may be cooled. As the refrigerant flows from the evaporator 33 to the second inlet 34b of the compressor 34, the refrigerant may be compressed by the compressor 34. As the first port 45a and the second port 45b of the third three-way valve 45 are opened, and the third port 45c of the third three-way valve 45 is closed, the refrigerant may flow from the compressor 34 to the interior heat exchanger 32. Here, while passing through the refrigerant coil (the refrigerant passage) of the interior heat exchanger 32, the refrigerant may release heat to the surroundings and condense. As the first port 46a and the second port 46b of the fourth three-way valve 46 are opened, and the third port 46c of the fourth three-way valve 46 is closed, the refrigerant may flow from the interior heat exchanger 32 to the exterior heat exchanger 31. Here, while passing through the refrigerant coil (the refrigerant passage) of the exterior heat exchanger 31, the refrigerant may release heat to the surroundings and condense.

The refrigerant may sequentially pass through the interior heat exchanger 32 and the exterior heat exchanger 31 in the second mode so that the refrigerant may be primarily condensed by the interior heat exchanger 32, and be secondarily condensed by the exterior heat exchanger 31. In the second mode, all of the interior heat exchanger 32 and the exterior heat exchanger 31 may serve as a condenser, and thus the condensation efficiency of the refrigerant may be significantly improved.

Figure 4:
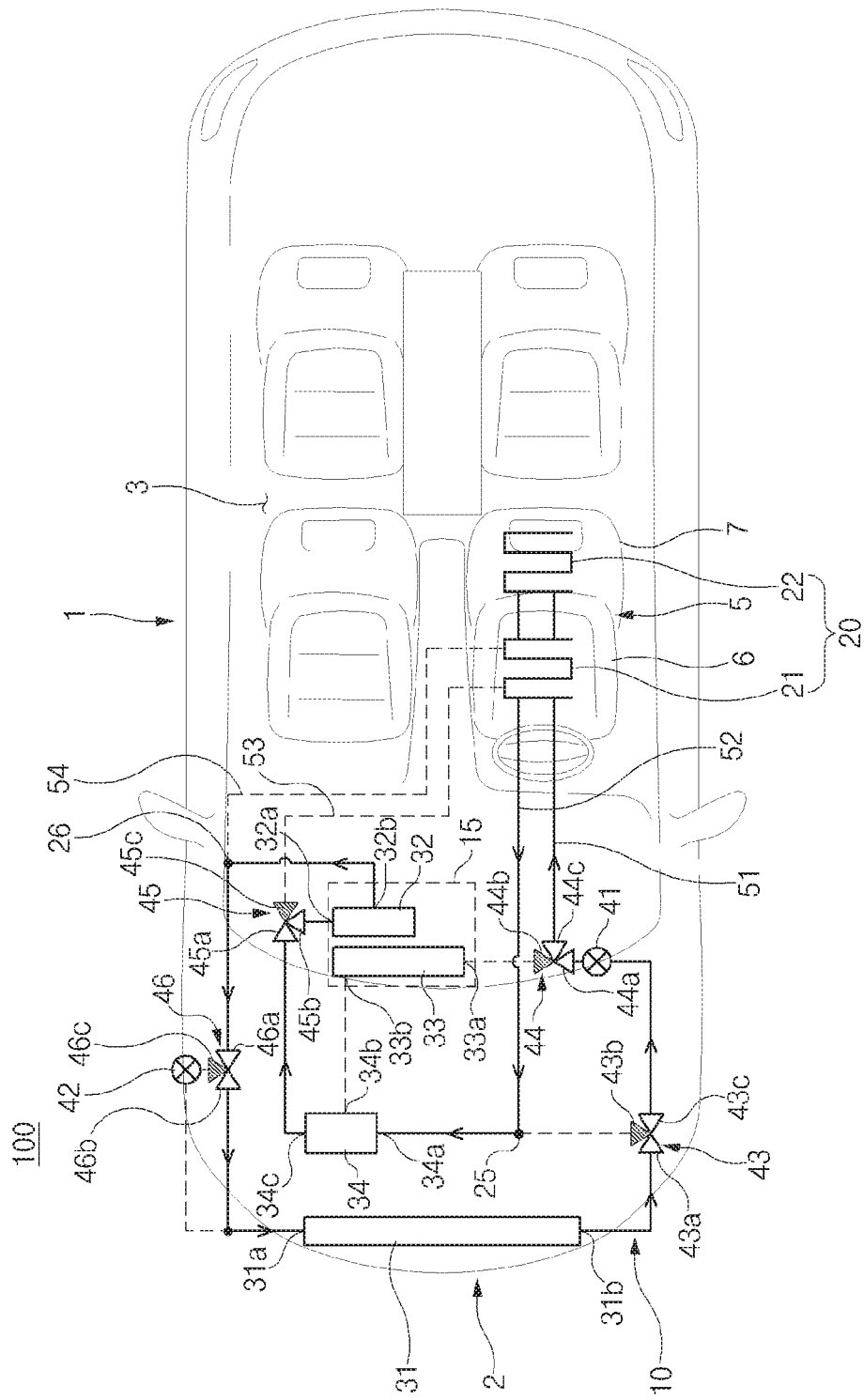
FIG. 4 illustrates a third mode of a vehicle climate control system according to an exemplary embodiment of the present disclosure.

FIG. 4 illustrates a third mode in which only the cooling operation of the vehicle seat 5 is performed. That is, in the third mode, only the vehicle seat 5 may be cooled.

Referring to FIG. 4, as the second poll 43b of the first three-way valve 43 is closed, and the first port 43a and the third port 43c of the first three-way valve 43 are opened, the refrigerant may flow from the exterior heat exchanger 31 to the first expansion valve 41. As the refrigerant is expanded in the first expansion valve 41, the pressure of the refrigerant may be reduced. As the first port 44a and the third port 44c of the second three-way valve 44 are opened, and the second port 44b of the second three-way valve 44 is closed, the first inlet passage 51 of the seat coil 20 may be opened, and the inlet 33a of the evaporator 33 may be blocked. The refrigerant may only flow into the seat coil 20 without flowing into the evaporator 33. As the refrigerant passes through the seat coil 20, it may absorb heat from the vehicle seat 5 and evaporate, and thus the vehicle seat 5 may be cooled. As the refrigerant flows from the seat coil 20 to the first inlet 34a of the compressor 34 through the first outlet passage 52, the refrigerant may be compressed by the compressor 34. As the first port 45a and the second port 45b of the third three-way valve 45 are opened, and the third poll 45c of the third three-way valve 45 is closed, the refrigerant compressed by the compressor 34 may pass through the refrigerant coil (the refrigerant passage) of the interior heat exchanger 32. While passing through the refrigerant coil (the refrigerant passage) of the interior heat exchanger 32, the refrigerant may release heat to the surroundings and condense. As the first port 46a and the second port 46b of the fourth three-way valve 46 are opened, and the third port 46c of the fourth three-way valve 46 is closed, the refrigerant may flow from the interior heat exchanger 32 to the exterior heat exchanger 31. Here, while passing through the refrigerant coil (the refrigerant passage) of the exterior heat exchanger 31, the refrigerant may release heat to the surroundings and condense.

The refrigerant may sequentially pass through the interior heat exchanger 32 and the exterior heat exchanger 31 in the third mode, so that the refrigerant may be primarily condensed by the interior heat exchanger 32, and be secondarily condensed by the exterior heat exchanger 31. In the third mode, all of the interior heat exchanger 32 and the exterior heat exchanger 31 may serve as a condenser, so that the condensation efficiency of the refrigerant may be significantly improved.

Figure 5:
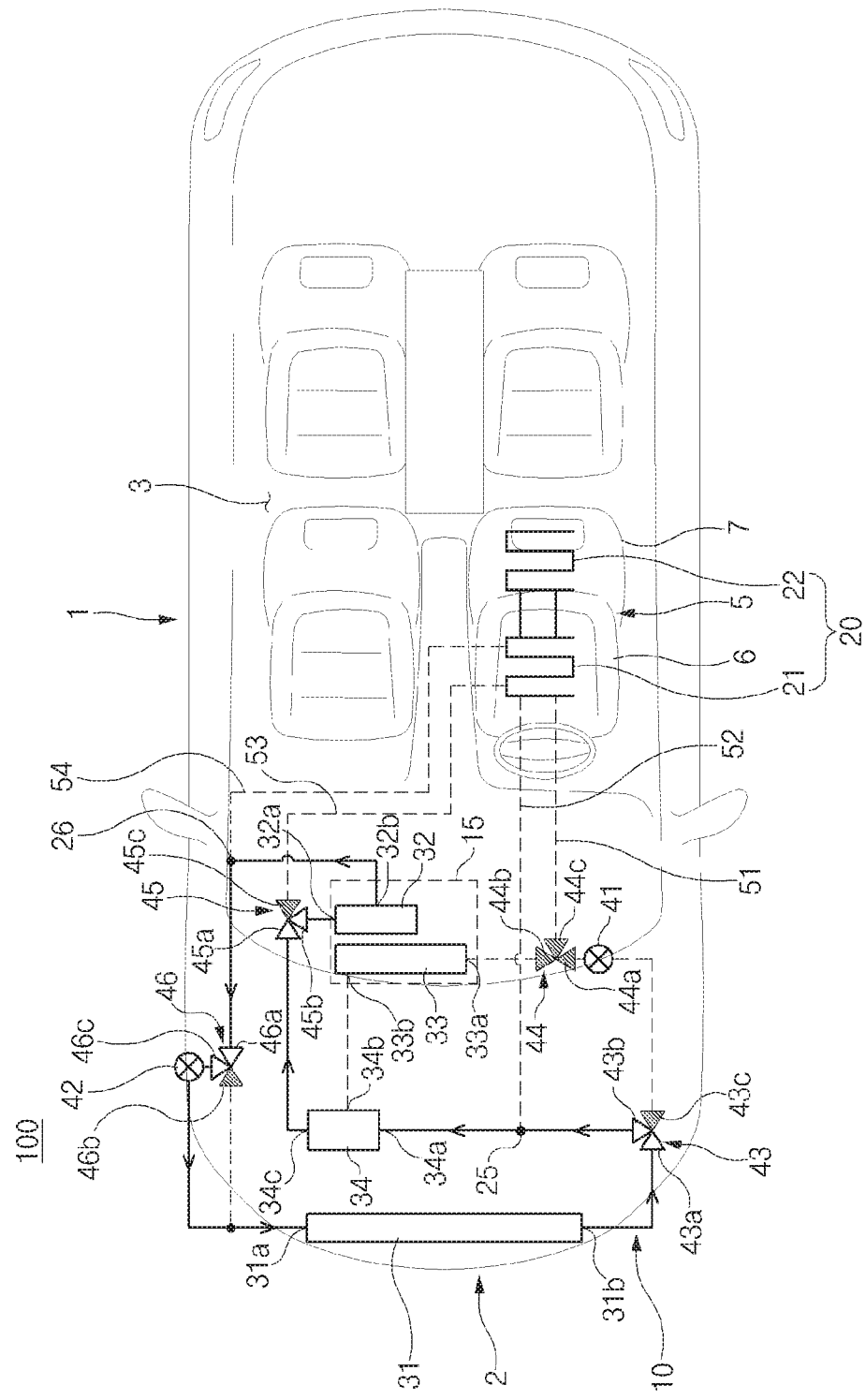
FIG. 5 illustrates a fourth mode of a vehicle climate control system according to an exemplary embodiment of the present disclosure.

FIG. 5 illustrates a fourth mode in which only the heating operation of the air conditioning unit 10 is performed. That is, in the fourth mode, only the passenger compartment 3 may be heated.

Referring to FIG. 5, as the third port 43c of the first three-way valve 43 is closed, and the first port 43a and the second port 43b of the first three-way valve 43 are opened, the refrigerant may flow from the exterior heat exchanger 31 to the first inlet 34a of the compressor 34. Here, the refrigerant may be compressed by the compressor 34. As the third port 43c of the first three-way valve 43 is closed, and the first port 44a, the second port 44b, and the third port 44c of the second three-way valve 44 are closed, the first inlet passage 51 and the first outlet passage 52 of the seat coil 20 may be blocked. As the first port 45a and the second port 45b of the third three-way valve 45 are opened, and the third port 45c of the third three-way valve 45 is closed, the refrigerant may flow from the outlet 34c of the compressor 34 to the interior heat exchanger 32. As the refrigerant compressed by the compressor 34 passes through the refrigerant coil (the refrigerant passage) of the interior heat exchanger 32, it may release heat to the surroundings and condense, which increases the temperature of the air passing through the interior heat exchanger 32. When the air passing through the interior heat exchanger 32 is discharged into the passenger compartment 3 through the air conditioning duct 15, the passenger compartment 3 may be heated. As the first port 46a and the third port 46c of the fourth three-way valve 46 are opened, and the second port 46b of the fourth three-way valve 46 is closed, the refrigerant may flow into the second expansion valve 42. Here, the pressure of the refrigerant may be reduced by the second expansion valve 42. The refrigerant may flow from the second expansion valve 42 to the exterior heat exchanger 31. Here, while passing through the refrigerant coil (the refrigerant passage) of the exterior heat exchanger 31, the refrigerant may absorb heat from the surroundings and evaporate.

In the fourth mode, the interior heat exchanger 32 may serve as a condenser, and the exterior heat exchanger 31 may serve as an evaporator.

Figure 6:
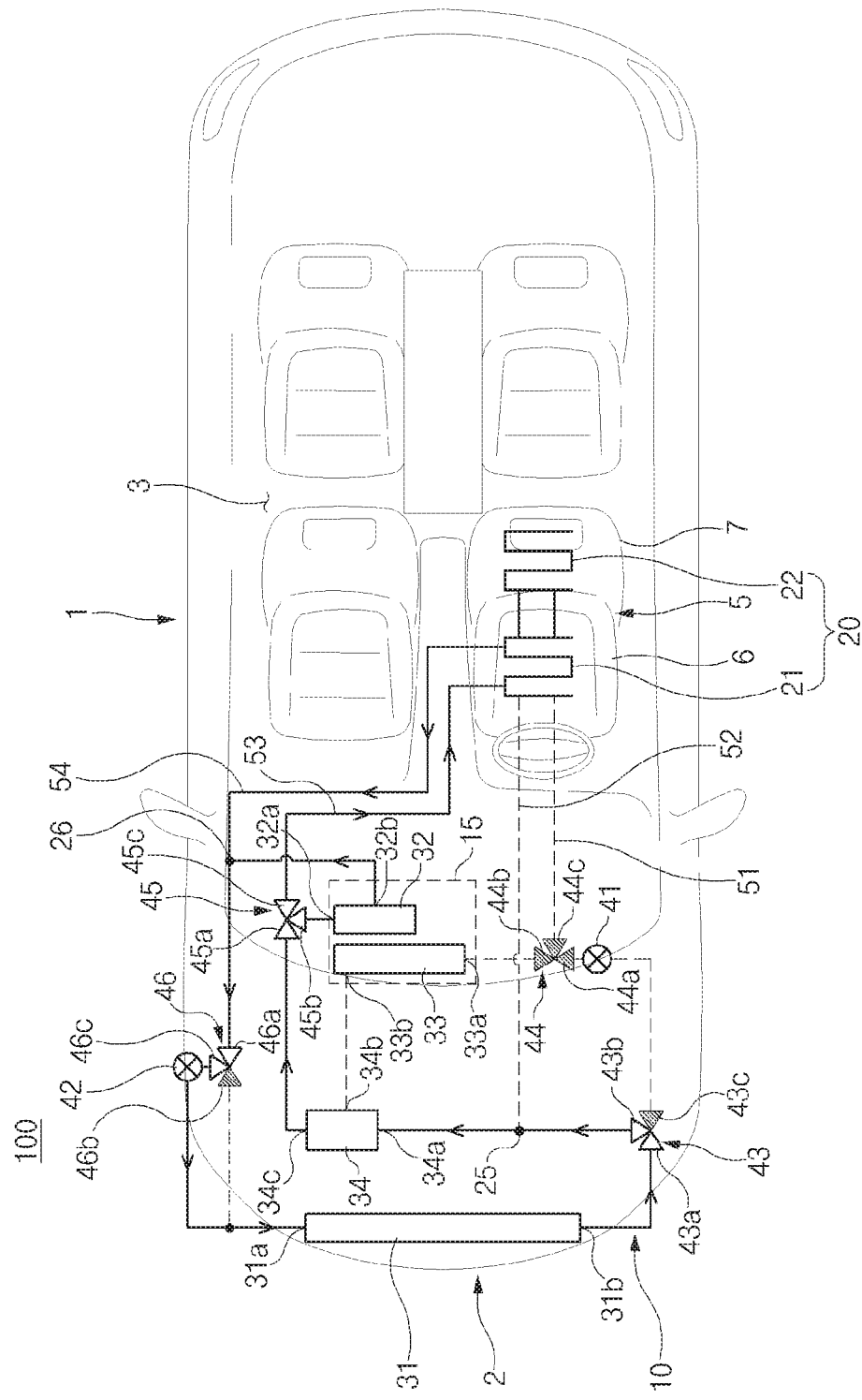
FIG. 6 illustrates a fifth mode of a vehicle climate control system according to an exemplary embodiment of the present disclosure.

FIG. 6 illustrates a fifth mode in which the heating operation of the air conditioning unit 10 and the heating operation of the vehicle seat 5 are performed together. That is, in the fifth mode, the passenger compartment 3 and the vehicle seat 5 may be heated together.

Referring to FIG. 6, as the third port 43c of the first three-way valve 43 is closed, and the first port 43a and the second port 43b of the first three-way valve 43 are opened, the refrigerant may flow from the exterior heat exchanger 31 to the first inlet 34a of the compressor 34. Here, the refrigerant may be compressed by the compressor 34. As the first port 44a, the second port 44b, and the third port 44c of the second three-way valve 44 are closed, the first inlet passage 51 and the first outlet passage 52 of the seat coil 20 may be blocked. As the first port 45a, the second port 45b, and the third port 45c of the third three-way valve 45 are opened, the refrigerant may be distributed by the third three-way valve 45. Some refrigerant may flow into the seat coil 20, and the rest of the refrigerant may flow into the interior heat exchanger 32. As some refrigerant passes through the seat coil 20, it may release heat to the vehicle seat 5 and condense, and thus the vehicle seat 5 may be heated. As the rest of the refrigerant passes through the refrigerant coil (the refrigerant passage) of the interior heat exchanger 32, it may release heat to the surroundings and condense, which increases the temperature of the air passing through the interior heat exchanger 32. When the air passing through the interior heat exchanger 32 is discharged into the passenger compartment 3 through the air conditioning duct 15, the passenger compartment 3 may be heated. As the first port 46a and the third port 46c of the fourth three-way valve 46 are opened, and the second port 46b of the fourth three-way valve 46 is closed, some refrigerant may flow from the seat coil 20 to the second expansion valve 42, and the rest of the refrigerant may flow from the interior heat exchanger 32 to the second expansion valve 42. Here, the pressure of the refrigerant may be reduced by the second expansion valve 42. The refrigerant may flow from the second expansion valve 42 to the exterior heat exchanger 31. Here, while passing through the refrigerant coil (the refrigerant passage) of the exterior heat exchanger 31, the refrigerant may absorb heat from the surroundings and evaporate.

In the fifth mode, the seat coil 20 and the interior heat exchanger 32 may serve as a condenser, and the exterior heat exchanger 31 may serve as an evaporator.

Figure 7:
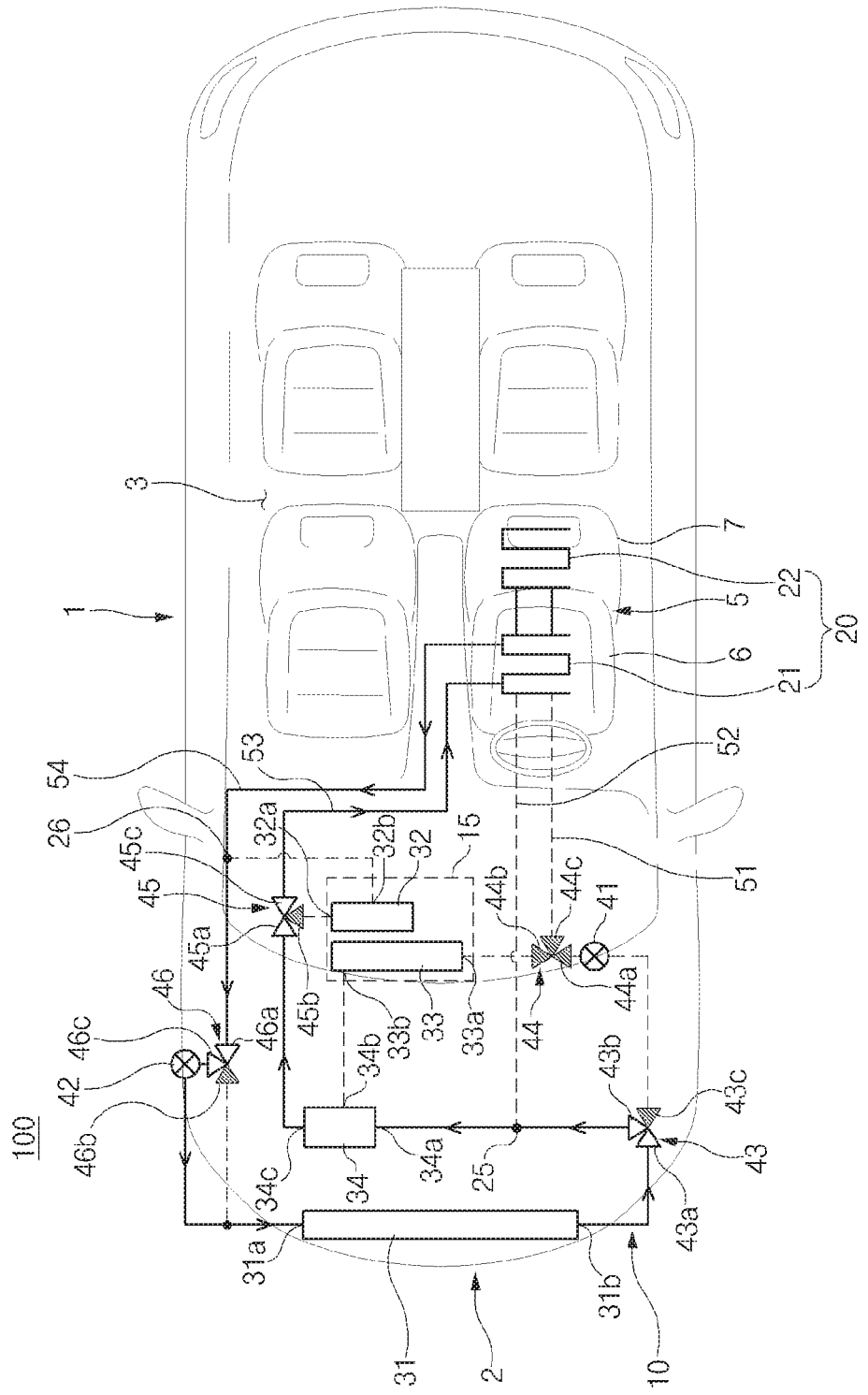
FIG. 7 illustrates a sixth mode of a vehicle climate control system according to an exemplary embodiment of the present disclosure.

FIG. 7 illustrates a sixth mode in which only the heating operation of the vehicle seat 5 is performed. That is, in the sixth mode, only the vehicle seat 5 may be heated.

Referring to FIG. 7, as the third port 43c of the first three-way valve 43 is closed, and the first port 43a and the second port 43b of the first three-way valve 43 are opened, the refrigerant may flow from the exterior heat exchanger 31 to the first inlet 34a of the compressor 34. Here, the refrigerant may be compressed by the compressor 34. As the first port 44a, the second port 44b, and the third port 44c of the second three-way valve 44 are closed, the first inlet passage 51 and the first outlet passage 52 of the seat coil 20 may be blocked. As the first port 45a and the third port 45c of the third three-way valve 45 are opened, and the second port 45b of the third three-way valve 45 is closed, the refrigerant may flow from the outlet 34c of the compressor 34 to the seat coil 20 through the second inlet passage 53. As the refrigerant compressed by the compressor 34 passes through the seat coil 20, it may release heat to the seat coil 20 and condense, and thus the vehicle seat 5 may be heated. As the first port 46a and the third port 46c of the fourth three-way valve 46 are opened, and the second port 46b of the fourth three-way valve 46 is closed, the refrigerant may flow into the second expansion valve 42. Here, the pressure of the refrigerant may be reduced by the second expansion valve 42. The refrigerant may flow from the second expansion valve 42 to the exterior heat exchanger 31. Here, while passing through the refrigerant coil (the refrigerant passage) of the exterior heat exchanger 31, the refrigerant may absorb heat from the surroundings and evaporate.

In the sixth mode, the seat coil 20 may serve as a condenser, and the exterior heat exchanger 31 may serve as an evaporator.

Figure 8:
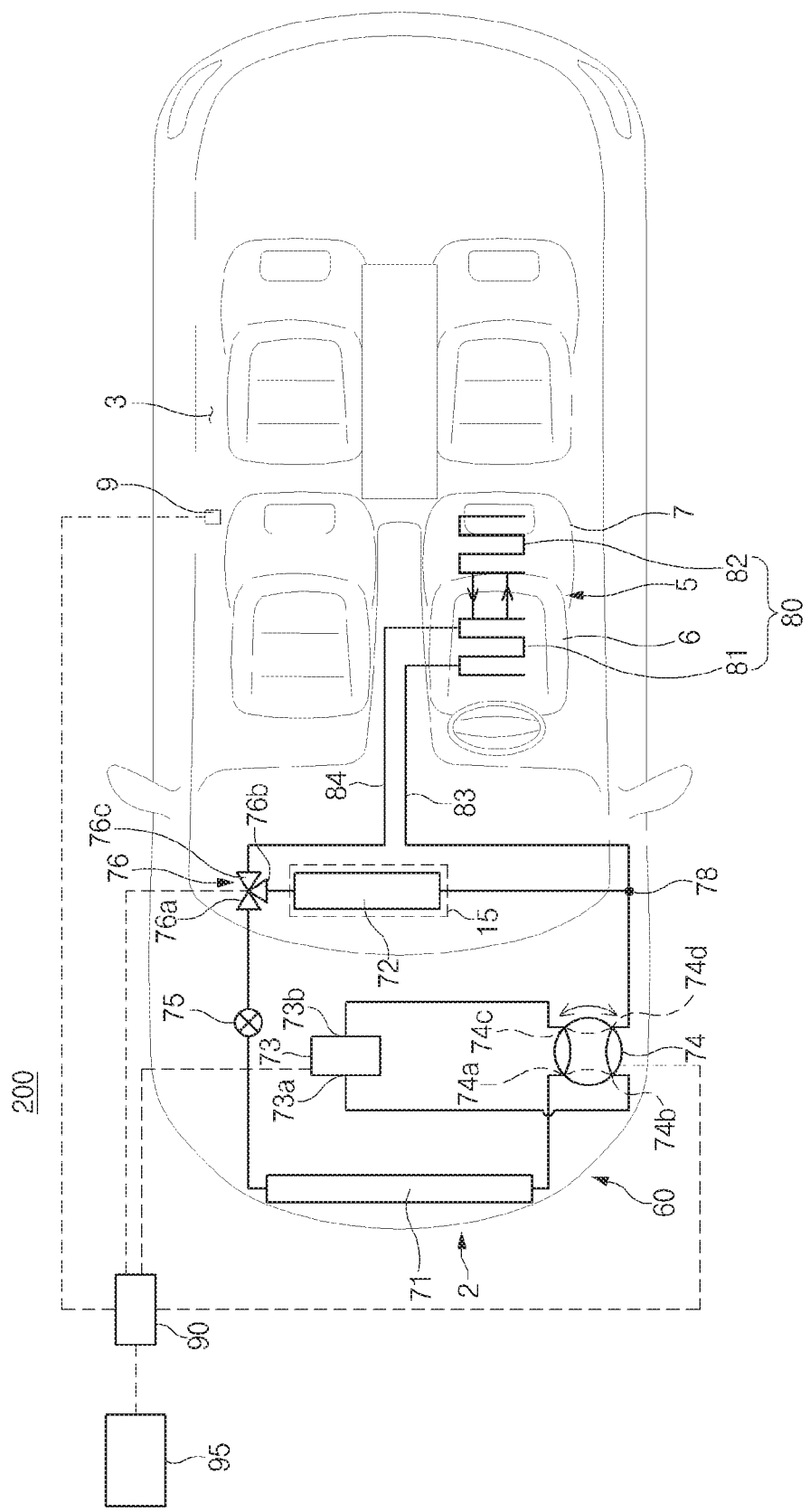
FIG. 8 illustrates a vehicle climate control system according to another exemplary embodiment of the present disclosure.

Referring to FIG. 8, a vehicle climate control system 200 according to another exemplary embodiment of the present disclosure may include an air conditioning unit 60 which conditions air flowing into the passenger compartment 3 of the vehicle 1 and a seat coil 80 which is fluidly connected to the air conditioning unit 60, and a refrigerant circulating in the air conditioning unit 60 may selectively circulate in the seat coil 80.

The air conditioning unit 60 may include a heat pump including an exterior heat exchanger 71, an interior heat exchanger 72, a compressor 73, a reversing valve 74, and an expansion valve 75.

The exterior heat exchanger 71 may be adjacent to the front end 2 of the vehicle 1, and the exterior heat exchanger 71 may have a refrigerant coil (a refrigerant passage) through which the refrigerant passes.

The interior heat exchanger 72 may be received in the air conditioning duct 15 of the air conditioning unit 60, and the air conditioning duct 15 may control the flow of the air into the passenger compartment 3. As the air is heated or cooled by the interior heat exchanger 72 located within the air conditioning duct 15, the temperature, humidity, and the like of the passenger compartment 3 may be adjusted. The air conditioning duct 15 may have an air mixing door (also referred to as "temperature door"). The air mixing door may control the air flow passing through the interior heat exchanger 72, thereby adjusting the temperature of the air flowing into the passenger compartment.

The compressor 73 may have an inlet 73a and an outlet 73b connected to the reversing valve 74.

The reversing valve 74 may connect the exterior heat exchanger 71, the interior heat exchanger 72, and the compressor 73. The reversing valve 74 may change a direction of flow of the refrigerant. The reversing valve 74 may be a four-way valve having a first port 74*a* connected to the exterior heat exchanger 71, a second port 74*b* connected to the inlet 73*a* of the compressor 73, a third port 74*c* connected to the outlet 73*b* of the compressor 73, and a fourth port 74*d* connected to the interior heat exchanger 72 and the seat coil 80. The reversing valve 74 may be a valve having an electrically controlled actuator.

The reversing valve 74 may move between a first position (see FIGS. 9, 10, and 11), in which the cooling operation of the air conditioning unit 60 and/or the cooling operation of the seat coil 80 is performed, and a second position (see FIGS. 12, 13, and 14), in which the heating operation of the air conditioning unit 60 and/or the heating operation of the seat coil 80 is performed.

Figure 9:
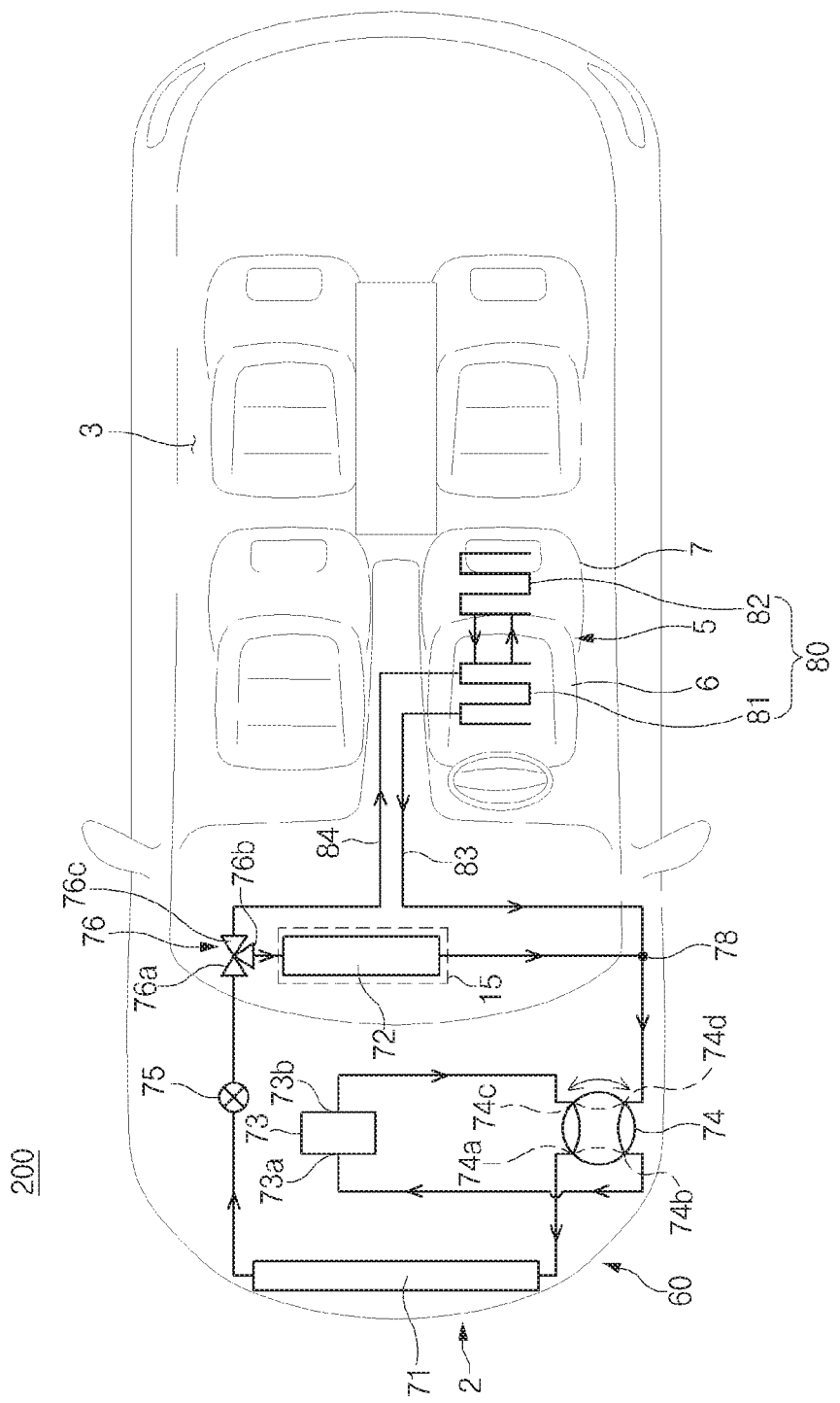
FIG. 9 illustrates a first mode of a vehicle climate control system according to another exemplary embodiment of the present disclosure.
Figure 10:
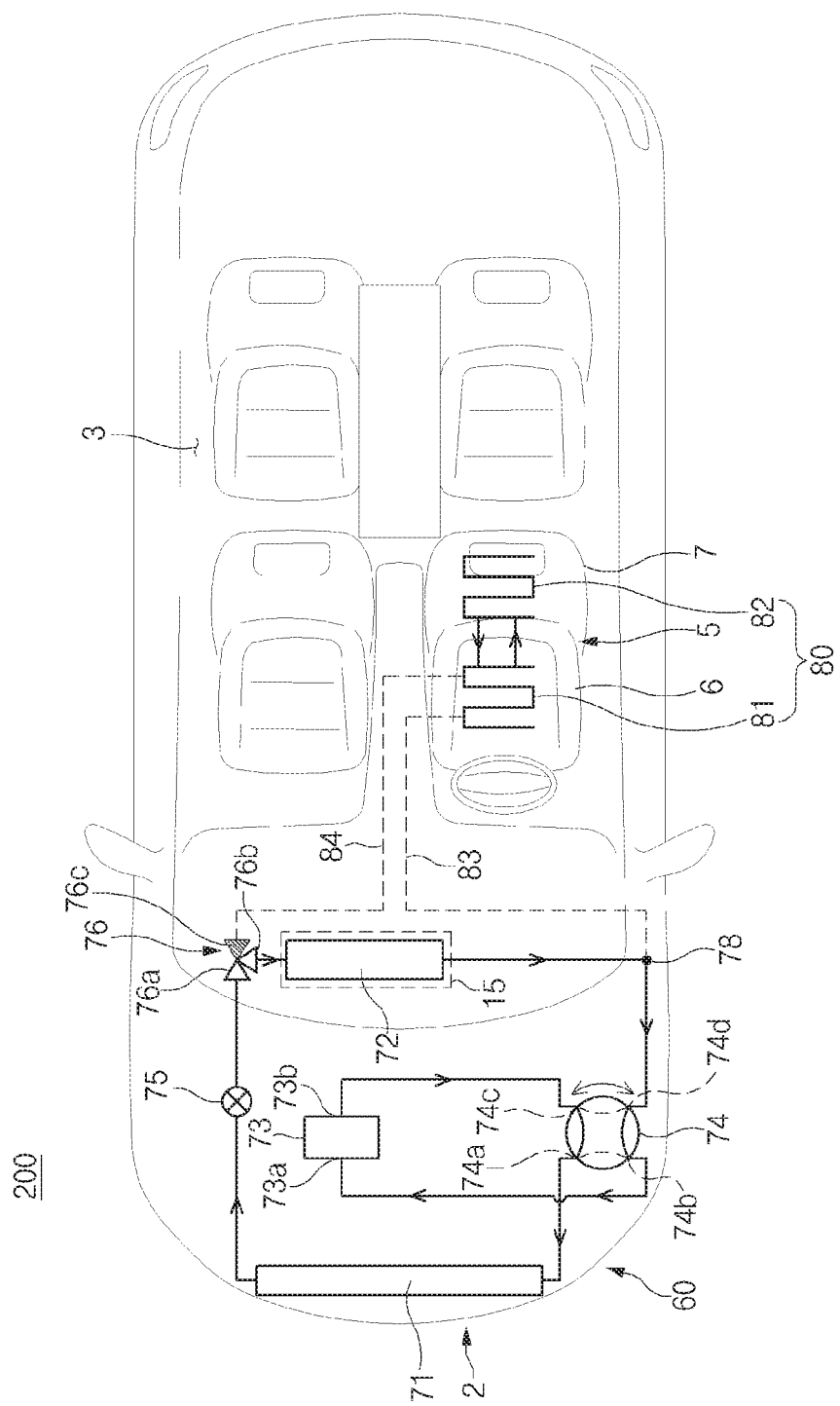
FIG. 10 illustrates a second mode of a vehicle climate control system according to another exemplary embodiment of the present disclosure.
Figure 11:
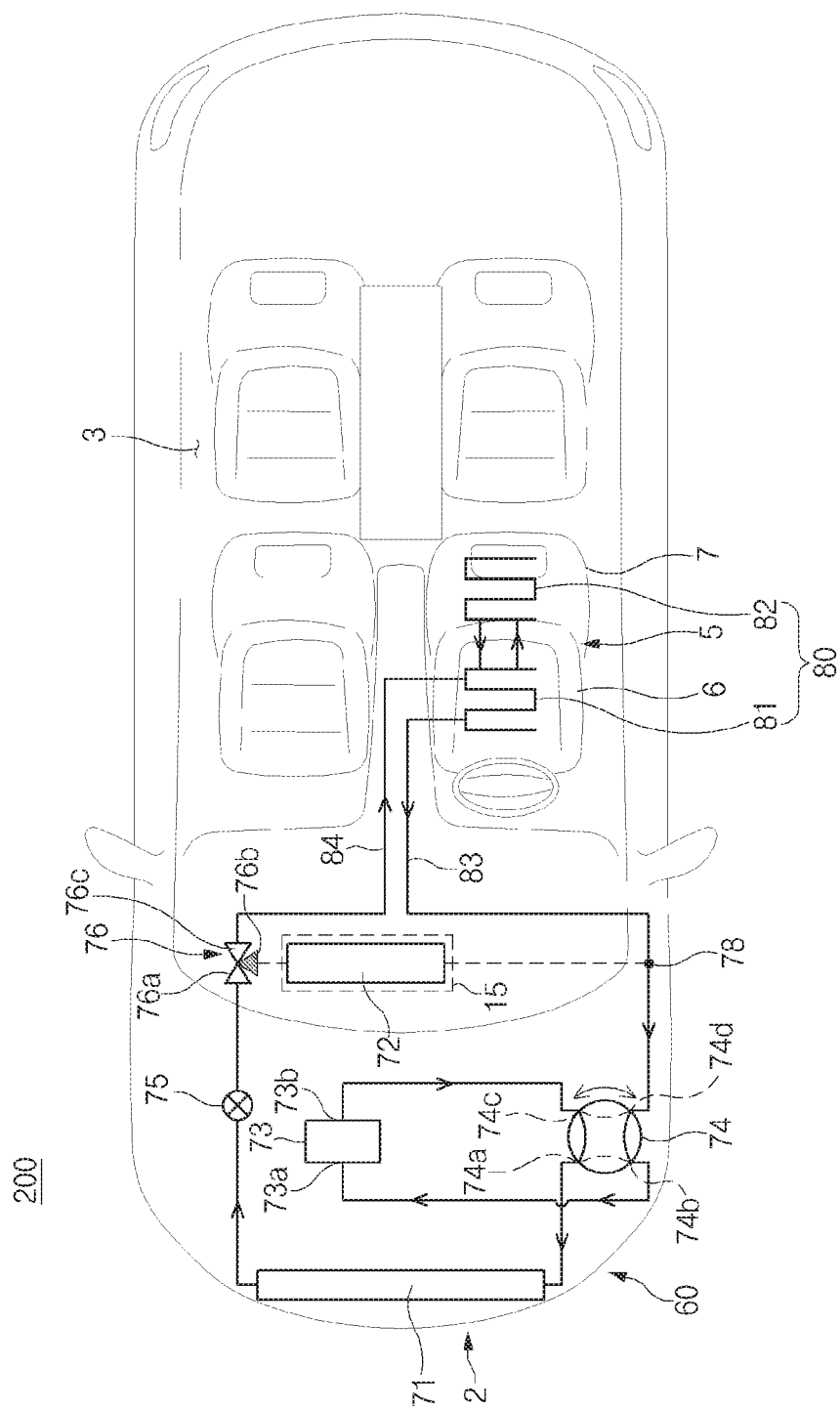
FIG. 11 illustrates a third mode of a vehicle climate control system according to another exemplary embodiment of the present disclosure.

Referring to FIGS. 9 to 11, the first position may be a position in which the first port 74*a* and the third port 74*c* communicate, and the second port 74*b* and the fourth port 74*d* communicate. Thus, the refrigerant may flow from the interior heat exchanger 72 and/or the seat coil 80 to the exterior heat exchanger 71.

Figure 12:
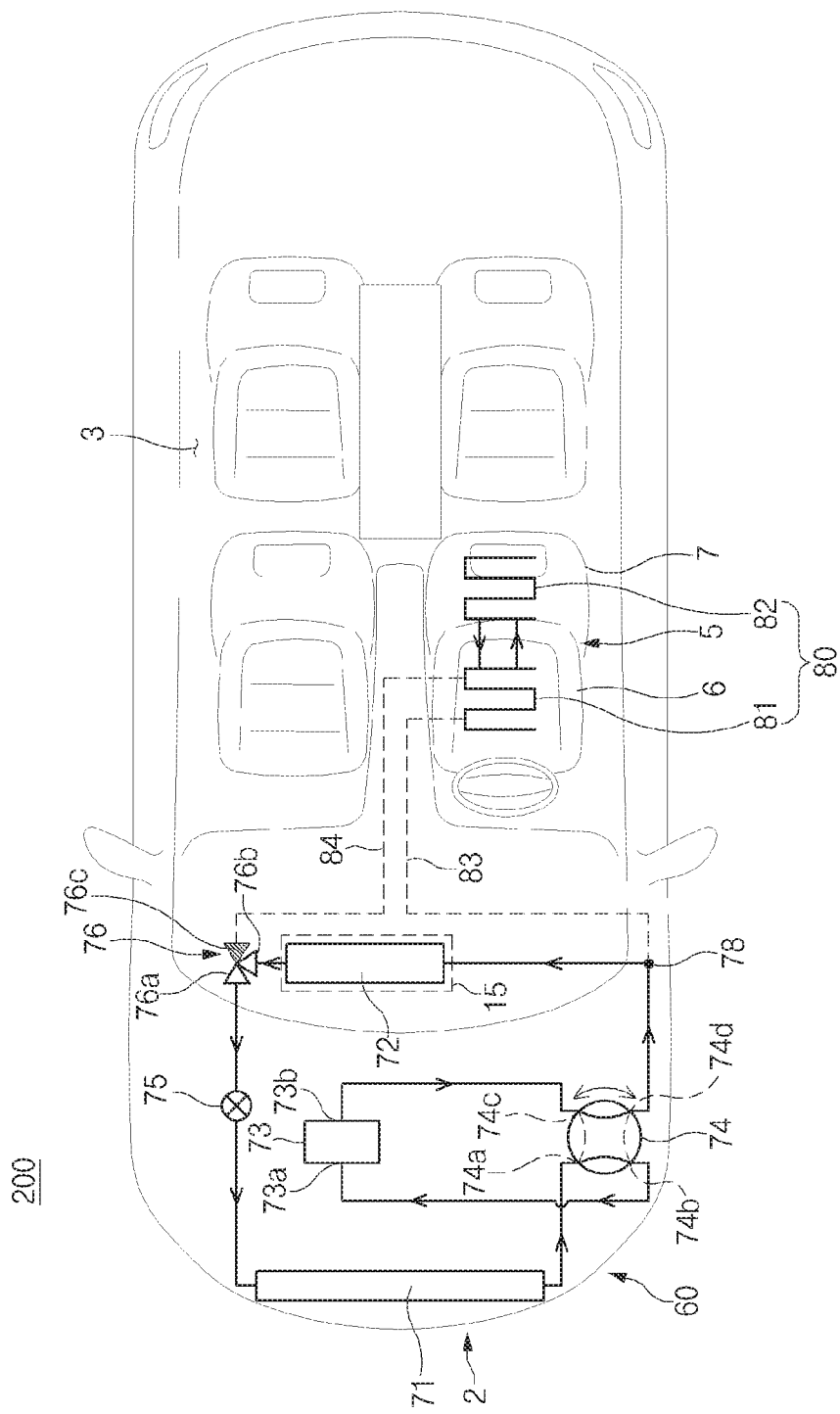
FIG. 12 illustrates a fourth mode of a vehicle climate control system according to another exemplary embodiment of the present disclosure.
Figure 13:
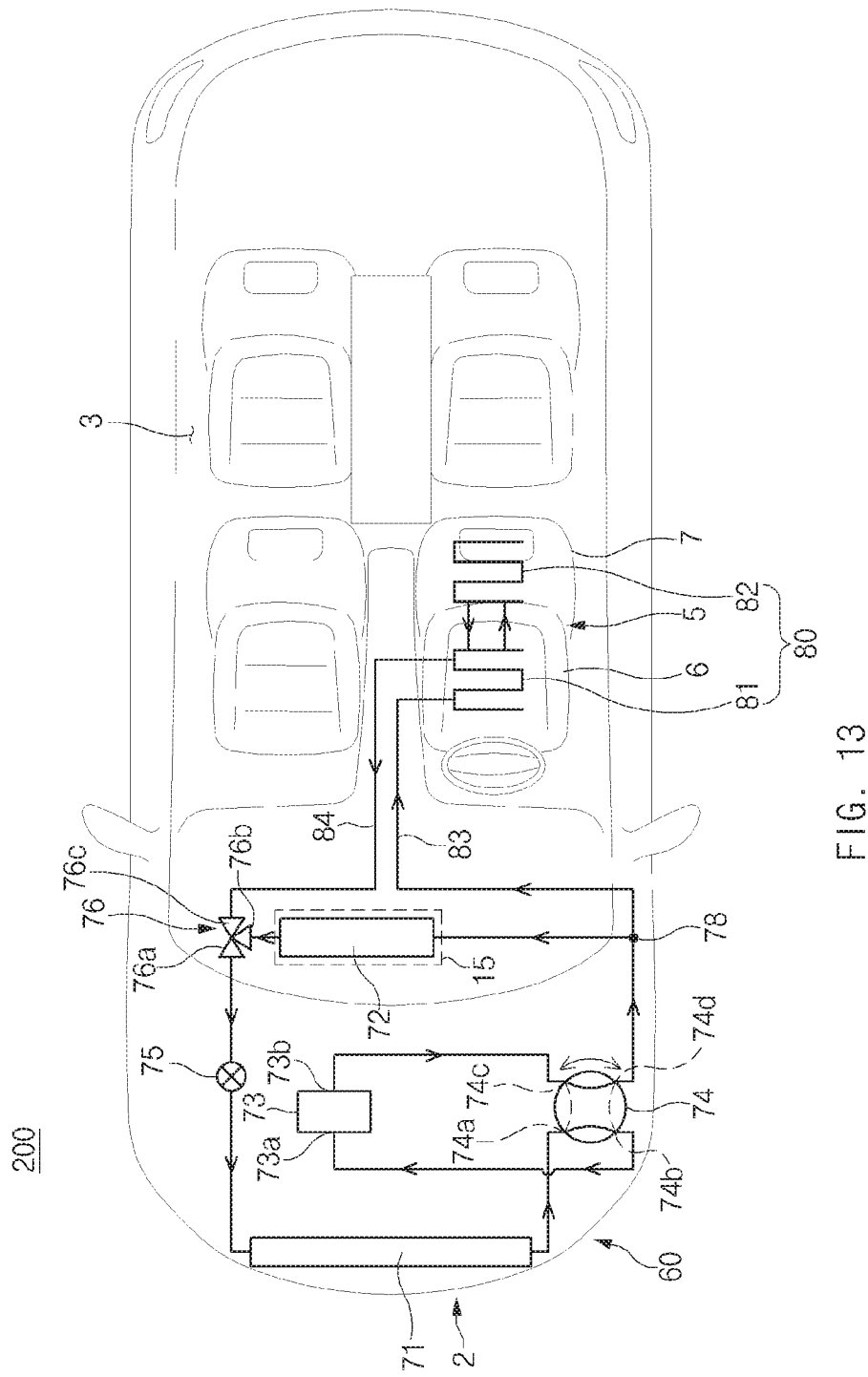
FIG. 13 illustrates a fifth mode of a vehicle climate control system according to another exemplary embodiment of the present disclosure.
Figure 14:
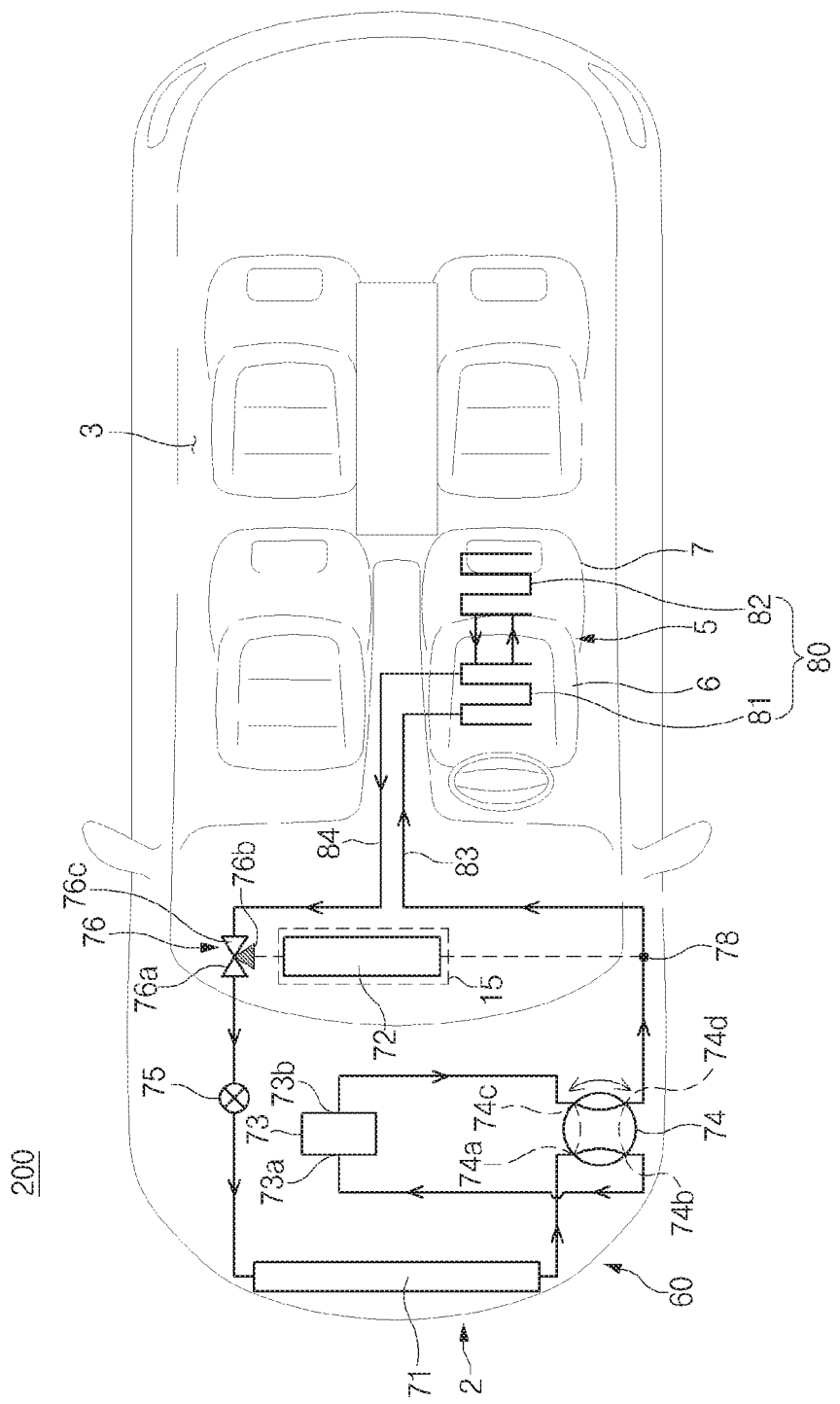
FIG. 14 illustrates a sixth mode of a vehicle climate control system according to another exemplary embodiment of the present disclosure.

Referring to FIGS. 12 to 14, the second position may be a position in which the first port 74*a* and the second port 74*b* communicate, and the third port 74*c* and the fourth port 74*d* communicate. Thus, the refrigerant may flow from the exterior heat exchanger 71 to the interior heat exchanger 72 and/or the seat coil 80.

The expansion valve 75 may be selectively connected to the interior heat exchanger 72, the exterior heat exchanger 71, and a second passage 84 of the seat coil 80.

The seat coil 80 may be embedded in the vehicle seat 5 to allow the circulation of the refrigerant. The seat coil 80 may include a first seat coil 81 embedded in the seat cushion 6 of the vehicle seat 5, and a second seat coil 82 embedded in the seat back 7 of the vehicle seat 5. The first seat coil 81 and the second seat coil 82 may be fluidly connected to each other.

The seat coil 80 may be fluidly connected to the air conditioning unit 60 through a first passage 83 and the second passage 84. The first passage 83 may be connected to a junction point 78 of a passage connecting between the interior heat exchanger 72 and the reversing valve 74.

The second passage 84 may be connected to a passage connecting between the expansion valve 75 and the interior heat exchanger 72. In particular, the second passage 84 may be selectively connected to the expansion valve 75 through a three-way valve 76.

The three-way valve 76 may include a first port 76*a* connected to the expansion valve 75, a second port 76*b* connected to the interior heat exchanger 72, and a third port 76*c* connected to the seat coil 80. In particular, the second passage 84 of the seat coil 80 may be connected to the third port 76*c* of the three-way valve 76. The three-way valve 76 may selectively open and close three ports 76*a*, 76*b*, and 76*c*, so that the three-way valve 76 may selectively connect the expansion valve 75, the interior heat exchanger 72, and the second passage 84 of the seat coil 80. For example, the three-way valve 76 may be a valve having an electrically controlled actuator.

A controller 90 may control the operation of the compressor 73, the operation of the reversing valve 74, and the operation of the three-way valve 76.

The controller 90 may be a vehicle controller such as an ECU. The controller 90 may include a processor and a memory. The processor may receive instructions stored in the memory, and be programmed to transmit instructions to the compressor 73, the three-way valve 76, and the reversing valve 74. The memory may be a data store such as a hard disk drive, a solid state drive, a server, a volatile storage medium, or a non-volatile storage medium.

A user interface 95 may be electrically connected to the controller 90. The user interface 95 may have various input means, such as a switch, a button, a knob, and a touch screen, for the cooling operation of the air conditioning unit 60, the heating operation of the air conditioning unit 60, the cooling operation of the vehicle seat 5, the heating operation of the vehicle seat 5, target temperature setting of the air conditioning unit 60, and target temperature setting of the vehicle seat 5.

FIG. 9 illustrates a first mode in which the cooling operation of the air conditioning unit 60 and the cooling operation of the vehicle seat 5 are performed together. That is, in the first mode, the passenger compartment 3 and the vehicle seat 5 may be cooled together.

Referring to FIG. 9, as the first port 76*a*, the second port 76*b*, and the third port 76*c* of the three-way valve 76 are opened, the refrigerant may flow from the expansion valve 75 to the interior heat exchanger 72 and the seat coil 80. That is, the refrigerant may be distributed by the three-way valve 76 and flow into the interior heat exchanger 72 and the seat coil 80. Some refrigerant may flow into the interior heat exchanger 72, and the rest of the refrigerant may flow into the seat coil 80. As some refrigerant passes through the refrigerant coil of the interior heat exchanger 72, it may absorb heat from the surroundings and evaporate, thereby lowering the temperature of the air passing through the interior heat exchanger 72. When the air passing through the interior heat exchanger 72 is discharged into the passenger compartment 3 through the air conditioning duct 15, the passenger compartment 3 may be cooled. As the rest of the refrigerant passes through the seat coil 80, it may absorb heat from the vehicle seat 5 and evaporate, and thus the vehicle seat 5 may be cooled. As the reversing valve 74 moves to the first position, the first port 74*a* and the third port 74*c* of the reversing valve 74 may communicate with each other, and the second port 74*b* and the fourth port 74*d* of the reversing valve 74 may communicate with each other. As the refrigerant flows from the interior heat exchanger 72 and the seat coil 80 to the inlet 73*a* of the compressor 73 through the fourth port 74*d* and the second port 74*b* of the reversing valve 74, the refrigerant may be compressed by the compressor 73. The refrigerant compressed by the compressor 73 may flow from the outlet 73*b* of the compressor 73 to the exterior heat exchanger 71. As the refrigerant passes through the refrigerant coil (the refrigerant passage) of the exterior heat exchanger 71, it may release heat to the surroundings and condense. The refrigerant condensed by the exterior heat exchanger 71 may flow into the expansion valve 75. As the refrigerant is expanded in the expansion valve 75, the pressure of the refrigerant may be reduced.

In the first mode, the seat coil 80 and the interior heat exchanger 72 may serve as an evaporator, and the exterior heat exchanger 71 may serve as a condenser.

FIG. 10 illustrates a second mode in which only the cooling operation of the air conditioning unit 60 is performed. That is, in the second mode, only the passenger compartment 3 may be cooled.

Referring to FIG. 10, as the first port 76*a* and the second port 76*b* of the three-way valve 76 are opened, and the third port 76*c* of the three-way valve 76 is closed, the refrigerant may flow from the expansion valve 75 to the interior heat exchanger 72, but may not flow into the seat coil 80. As the refrigerant passes through the refrigerant coil of the interior heat exchanger 72, it may absorb heat from the surroundings and evaporate, thereby lowering the temperature of the air passing through the interior heat exchanger 72. When the air passing through the interior heat exchanger 72 is discharged into the passenger compartment 3 through the air conditioning duct 15, the passenger compartment 3 may be cooled. As the reversing valve 74 moves to the first position, the first port 74a and the third port 74c of the reversing valve 74 may communicate with each other, and the second port 74b and the fourth port 74d of the reversing valve 74 may communicate with each other. As the refrigerant flows from the interior heat exchanger 72 to the inlet 73a of the compressor 73 through the fourth port 74d and the second port 74b of the reversing valve 74, the refrigerant may be compressed by the compressor 73. The refrigerant compressed by the compressor 73 may flow from the outlet 73b of the compressor 73 to the exterior heat exchanger 71 through the third port 74c and the first port 74a of the reversing valve 74. As the refrigerant passes through the refrigerant coil (the refrigerant passage) of the exterior heat exchanger 71, it may release heat to the surroundings and condense. The refrigerant condensed by the exterior heat exchanger 71 may flow into the expansion valve 75. As the refrigerant is expanded in the expansion valve 75, the pressure of the refrigerant may be reduced.

In the second mode, the interior heat exchanger 72 may serve as an evaporator, and the exterior heat exchanger 71 may serve as a condenser.

FIG. 11 illustrates a third mode in which only the cooling operation of the vehicle seat 5 is performed. That is, in the third mode, only the vehicle seat 5 may be cooled.

Referring to FIG. 11, as the first port 76a and the third port 76c of the three-way valve 76 are opened, and the second port 76b of the three-way valve 76 is closed, the refrigerant may flow from the expansion valve 75 to the seat coil 80, but may not flow into the interior heat exchanger 72. As the refrigerant passes through the seat coil 80, it may absorb heat from the vehicle seat 5 and evaporate, and thus the vehicle seat 5 may be cooled. As the reversing valve 74 moves to the first position, the first port 74a and the third port 74c of the reversing valve 74 may communicate with each other, and the second port 74b and the fourth port 74d of the reversing valve 74 may communicate with each other. As the refrigerant flows from the interior heat exchanger 72 to the inlet 73a of the compressor 73 through the fourth port 74d and the second port 74b of the reversing valve 74, the refrigerant may be compressed by the compressor 73. The refrigerant compressed by the compressor 73 may flow from the outlet 73b of the compressor 73 to the exterior heat exchanger 71 through the third port 74c and the first port 74a of the reversing valve 74. As the refrigerant passes through the refrigerant coil (the refrigerant passage) of the exterior heat exchanger 71, it may release heat to the surroundings and condense. The refrigerant condensed by the exterior heat exchanger 71 may flow into the expansion valve 75. As the refrigerant is expanded in the expansion valve 75, the pressure of the refrigerant may be reduced.

In the third mode, the seat coil 80 may serve as an evaporator, and the exterior heat exchanger 71 may serve as a condenser.

FIG. 12 illustrates a fourth mode in which only the heating operation of the air conditioning unit 60 is performed. That is, in the fourth mode, only the passenger compartment 3 may be heated.

Referring to FIG. 12, as the first port 76a and the second port 76b of the three-way valve 76 are opened, and the third port 76c of the three-way valve 76 is closed, the refrigerant may flow from the interior heat exchanger 72 to the expansion valve 75. As the refrigerant is expanded in the expansion valve 75, the pressure of the refrigerant may be reduced. As the third port 76c of the three-way valve 76 is closed, the second passage 84 may be blocked, and thus the refrigerant may not circulate in the seat coil 80. As the refrigerant decompressed by the expansion valve 75 passes through the refrigerant coil of the exterior heat exchanger 71, it may absorb heat from the surroundings and evaporate. As the reversing valve 74 moves to the second position, the first port 74a and the second port 74b of the reversing valve 74 may communicate with each other, and the third port 74c and the fourth port 74d of the reversing valve 74 may communicate with each other. As the refrigerant flows from the exterior heat exchanger 71 to the inlet 73a of the compressor 73 through the first port 74a and the second port 74b of the reversing valve 74, the refrigerant may be compressed by the compressor 73. The refrigerant compressed by the compressor 73 may flow from the outlet 73b of the compressor 73 to the interior heat exchanger 72 through the third port 74c and the fourth port 74d of the reversing valve 74. As the refrigerant passes through the refrigerant coil (the refrigerant passage) of the interior heat exchanger 72, it may release heat to the surroundings and condense, which increases the temperature of the air passing through the interior heat exchanger 72. When the air passing through the interior heat exchanger 72 is discharged into the passenger compartment 3 through the air conditioning duct 15, the passenger compartment 3 may be heated.

In the fourth mode, the interior heat exchanger 72 may serve as a condenser, and the exterior heat exchanger 71 may serve as an evaporator.

FIG. 13 illustrates a fifth mode in which the heating operation of the air conditioning unit 60 and the heating operation of the vehicle seat 5 are performed together. That is, in the fifth mode, the passenger compartment 3 and the vehicle seat 5 may be heated together.

Referring to FIG. 13, as the first port 76a, the second port 76b, and the third port 76c of the three-way valve 76 are all opened, the refrigerant may flow from the interior heat exchanger 72 and the seat coil 80 to the expansion valve 75. As the refrigerant is expanded in the expansion valve 75, the pressure of the refrigerant may be reduced. As the refrigerant decompressed by the expansion valve 75 passes through the refrigerant coil of the exterior heat exchanger 71, it may absorb heat from the surroundings and evaporate. As the reversing valve 74 moves to the second position, the first port 74a and the second port 74b of the reversing valve 74 may communicate with each other, and the third port 74c and the fourth port 74d of the reversing valve 74 may communicate with each other. As the refrigerant flows from the exterior heat exchanger 71 to the inlet 73a of the compressor 73 through the first port 74a and the second port 74b of the reversing valve 74, the refrigerant may be compressed by the compressor 73. The refrigerant compressed by the compressor 73 may flow from the outlet 73b of the compressor 73 to the interior heat exchanger 72 and the seat coil 80 through the third port 74c and the fourth port 74d of the reversing valve 74. As some refrigerant passes through the refrigerant coil (the refrigerant passage) of the interior heat exchanger 72, it may release heat to the surroundings and condense, which increases the temperature of the air passing through the interior heat exchanger 72. When the air passing through the interior heat exchanger 72 is discharged into the passenger compartment 3 through the air conditioning duct 15, the passenger compartment 3 may be heated. As the rest of the refrigerant passes through the seat coil 80, it may release heat to the vehicle seat 5 and condense, and thus the vehicle seat 5 may be heated.

In the fifth mode, the seat coil 80 and the interior heat exchanger 72 may serve as a condenser, and the exterior heat exchanger 71 may serve as an evaporator.

FIG. 14 illustrates a sixth mode in which only the heating operation of the vehicle seat 5 is performed. That is, in the sixth mode, only the vehicle seat 5 may be heated.

Referring to FIG. 14, as the first port 76a and the third port 76c of the three-way valve 76 are opened, and the second port 76b of the three-way valve 76 is closed, the refrigerant may flow from the seat coil 80 to the expansion valve 75. As the refrigerant is expanded in the expansion valve 75, the pressure of the refrigerant may be reduced. As the second port 76b of the three-way valve 76 is closed, the refrigerant may not circulate in the interior heat exchanger 72. As the refrigerant decompressed by the expansion valve 75 passes through the refrigerant coil of the exterior heat exchanger 71, it may absorb heat from the surroundings and evaporate. As the reversing valve 74 moves to the second position, the first port 74a and the second port 74b of the reversing valve 74 may communicate with each other, and the third port 74c and the fourth port 74d of the reversing valve 74 may communicate with each other. As the refrigerant flows from the exterior heat exchanger 71 to the inlet 73a of the compressor 73 through the first port 74a and the second port 74b of the reversing valve 74, the refrigerant may be compressed by the compressor 73. The refrigerant compressed by the compressor 73 may flow from the outlet 73b of the compressor 73 to the seat coil 80 through the third port 74c and the fourth port 74d of the reversing valve 74. As the refrigerant passes through the seat coil 80, it may release heat to the vehicle seat 5 and condense, and thus the vehicle seat 5 may be heated.

In the sixth mode, the seat coil 80 may serve as a condenser, and the exterior heat exchanger 71 may serve as an evaporator.

Figure 15:
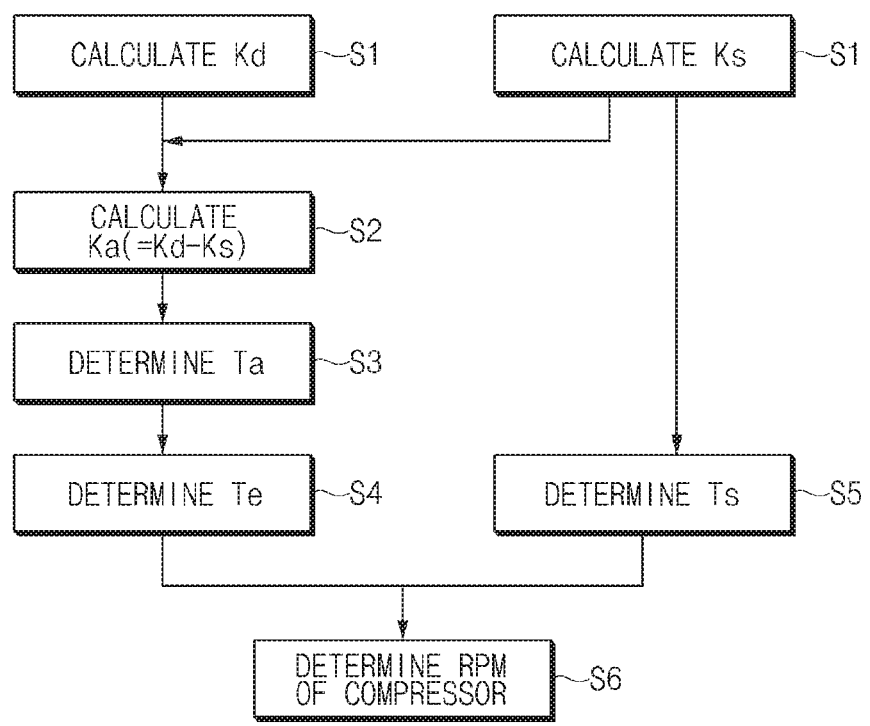
FIG. 15 illustrates a logic for controlling RPM of a compressor during a cooling operation of a vehicle climate control system according to an exemplary embodiment of the present disclosure.

Referring to FIG. 15, during the cooling operation of the vehicle climate control system 100 or 200, the controller 30 or 90 may calculate heat absorption quantities Kd and Ks required for cooling the air conditioning unit 10 or 60 and the seat coil 20 or 80 on the basis of a room temperature of the passenger compartment 3 which is measured by a temperature sensor 9 (see FIGS. 1 and 8), and a target temperature of the air conditioning unit 10 or 60 and a target temperature of the vehicle seat 5 which an occupant inputs using the user interface 40 or 95 (S1). Specifically, the controller 30 or 90 may calculate a first heat absorption quantity Kd required for cooling the air conditioning unit 10 or 60 on the basis of a first target temperature corresponding to the target temperature of the air conditioning unit 10 or 60, and may calculate a second heat absorption quantity Ks required for cooling the seat coil 20 or 80 on the basis of a second target temperature corresponding to the target temperature of the vehicle seat 5. The controller 30 or 90 may calculate a corrected heat quantity Ka by subtracting the second heat absorption quantity Ks from the first heat absorption quantity Kd (i.e., Ka=Kd−Ks) (S2). The controller 30 or 90 may determine or select a temperature Ta of air discharged from the air conditioning duct 15 to the passenger compartment 3 of the vehicle 1 on the basis of the corrected heat quantity Ka (S3). The controller 30 or 90 may determine or select a temperature of the evaporator 33 or the interior heat exchanger 32 or 72, that is, a temperature Te required for evaporation of a refrigerant on the basis of the determined air temperature Ta (S4). The controller 30 or 90 may determine or select a temperature Ts of the vehicle seat 5 on the basis of the second heat absorption quantity Ks (S5). The controller 30 or 90 may determine or select RPM of the compressor 34 or 73 on the basis of the determined temperature Te required for evaporation of the refrigerant and the determined temperature Ts of the vehicle seat 5 (S6), and thus power of the compressor 34 or 73 may be adjusted optimally.

Figure 16:
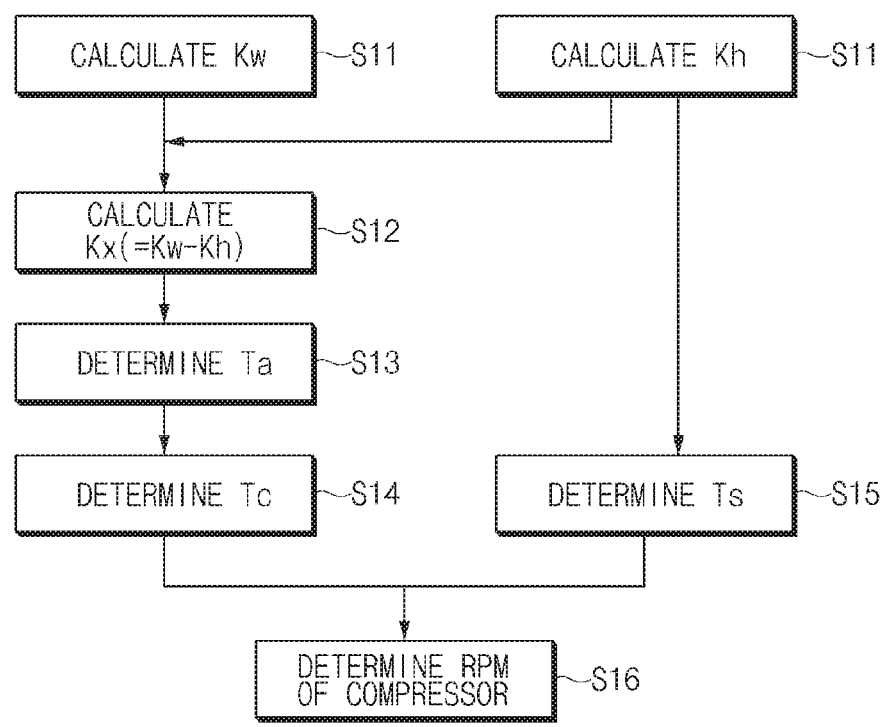
FIG. 16 illustrates a logic for controlling RPM of a compressor during a heating operation of a vehicle climate control system according to an exemplary embodiment of the present disclosure.

Referring to FIG. 16, during the heating operation of the vehicle climate control system 100 or 200, the controller 30 or 90 may calculate first and second heat release quantities Kw and Kh required for the heating operation of the air conditioning unit 10 or 60 and the heating operation of the seat coil 20 or 80, respectively, on the basis of a room temperature of the passenger compartment 3 which is measured by the temperature sensor 9, and a first target temperature corresponding to a target temperature of the air conditioning unit 10 or 60 and a second target temperature corresponding to a target temperature of the vehicle seat 5 which an occupant inputs using the user interface 40 or 95 (S11). The controller 30 or 90 may calculate a corrected heat quantity Kx by subtracting the second heat release quantity Kh from the first heat release quantity Kw (i.e., Kx=Kw−Kh) (S12). The controller 30 or 90 may determine or select a temperature Ta of air discharged from the air conditioning duct 15 to the passenger compartment 3 of the vehicle 1 on the basis of the corrected heat quantity Kx (S13). The controller 30 or 90 may determine or select a temperature of the interior heat exchanger 32 or 72, that is, a temperature Tc required for condensation of the refrigerant on the basis of the determined air temperature Ta (S14). The controller 30 or 90 may determine or select a temperature Ts of the vehicle seat 5 on the basis of the second heat release quantity Kh (S15). The controller 30 or 90 may determine or select RPM of the compressor 34 or 73 on the basis of the determined temperature Tc required for condensation of the refrigerant and the determined temperature Ts of the vehicle seat 5 (S16), and thus power of the compressor 34 or 73 may be adjusted optimally.

Since the power of the compressor is adjusted on the basis of the results obtained after separately calculating the heat quantity required for the passenger compartment of the vehicle and the heat quantity required for the vehicle seat, unnecessary power consumption of the compressor may be prevented, and thus fuel efficiency/energy efficiency may be improved.

Figure 17:
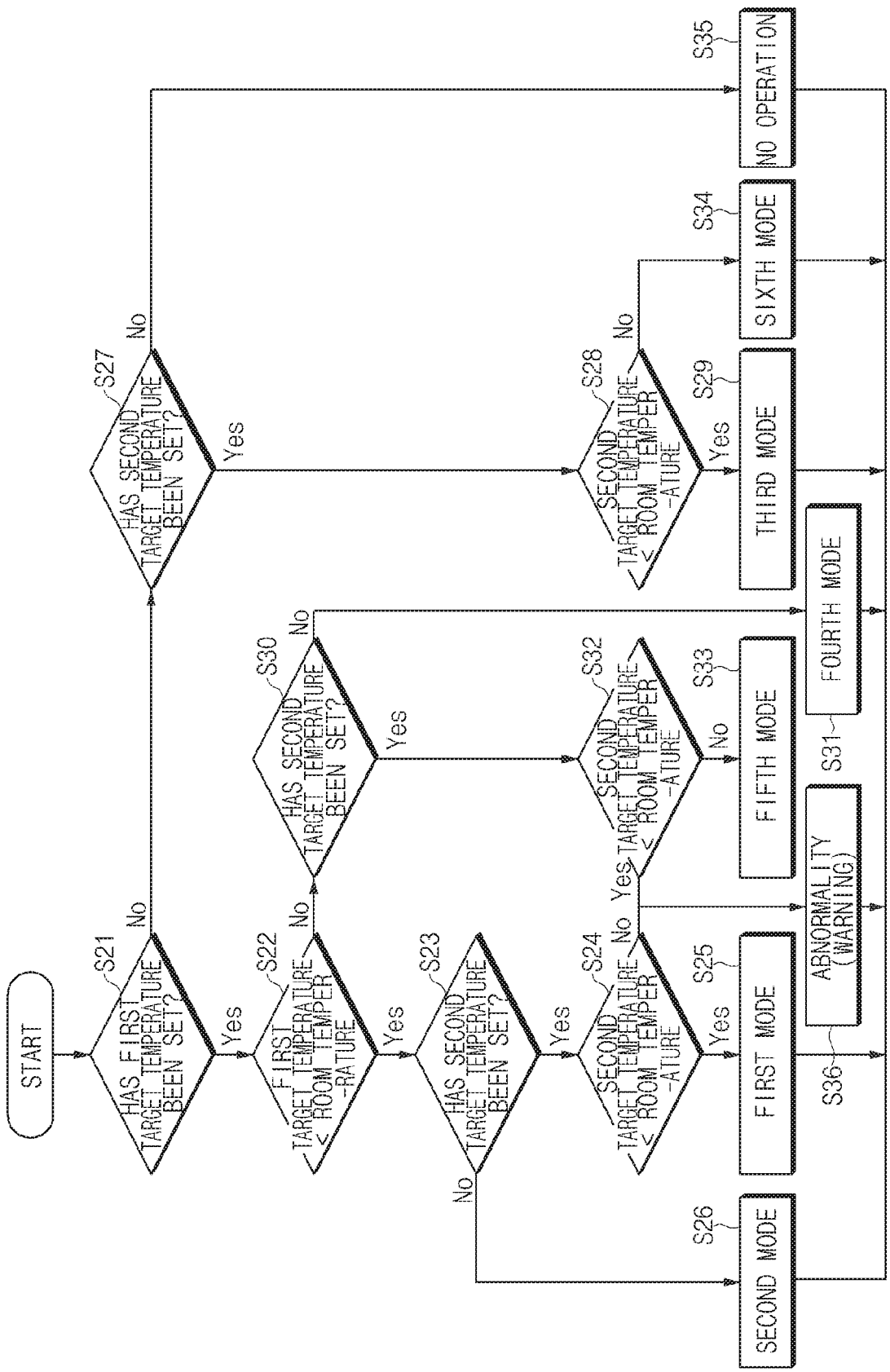
FIG. 17 illustrates a flowchart of a method for controlling a vehicle climate control system according to an exemplary embodiment of the present disclosure.

FIG. 17 illustrates a flowchart of a method for controlling the vehicle climate control system 100 or 200 according to an exemplary embodiment of the present disclosure.

The controller 30 or 90 may determine whether or not a first target temperature corresponding to a target temperature of the air conditioning unit 10 or 60 has been set (S21). For example, the controller 30 or 90 may determine whether or not an occupant has input the first target temperature to the user interface 40 or 95. When the first target temperature has been set, the controller 30 or 90 may determine that the cooling or heating of the air conditioning unit 10 or 60 is required. When the first target temperature has not been set, the controller 30 or 90 may determine that the cooling or heating of the air conditioning unit 10 or 60 is not required.

When the first target temperature has been set in S21, the controller 30 or 90 may determine whether or not the first target temperature is lower than a room temperature (S22). When the first target temperature is lower than the room temperature, the controller 30 or 90 may determine that the cooling of the air conditioning unit 10 or 60 is required. When the first target temperature is not lower than the room temperature, that is, the first target temperature is higher than or equal to the room temperature, the controller 30 or 90 may determine that the heating of the air conditioning unit 10 or 60 is required.

When the first target temperature is lower than the room temperature in S22, the controller 30 or 90 may determine whether or not a second target temperature corresponding to a target temperature of the vehicle seat 5 has been set (S23). For example, the controller 30 or 90 may determine whether or not the occupant has input the second target temperature to the user interface 40 or 95. When the second target temperature has been set, the controller 30 or 90 may determine that the cooling or heating of the vehicle seat 5 is required. When the second target temperature has not been set, the controller 30 or 90 may determine that the cooling or heating of the vehicle seat 5 is not required.

When the second target temperature has been set in S23, the controller 30 or 90 may determine whether or not the second target temperature is lower than the room temperature (S24). When the second target temperature is lower than the room temperature, the controller 30 or 90 may determine that the cooling of the vehicle seat 5 is required. When the second target temperature is not lower than the room temperature, that is, the second target temperature is higher than or equal to the room temperature, the controller 30 or 90 may determine that the heating of the vehicle seat 5 is required.

When the second target temperature is lower than the room temperature in S24, the controller 30 or 90 may operate in the first mode (S25). In the first mode, the cooling of the air conditioning unit 10 or 60 and the cooling of the vehicle seat 5 may be performed together.

When the second target temperature has not been set in S23, the controller 30 or 90 may operate in the second mode (S26). In the second mode, only the cooling of the air conditioning unit 10 or 60 may be performed.

When the first target temperature has not been set in S21, the controller 30 or 90 may determine whether or not the second target temperature has been set (S27) in a state in which it determines that the cooling or heating of the air conditioning unit 10 or 60 is not required.

When the second target temperature has been set in S27, indicating that the operation (cooling or heating) of the vehicle seat 5 is required, the controller 30 or 90 may determine whether or not the second target temperature is lower than the room temperature (S28).

When the second target temperature is lower than the room temperature in S28, indicating that the cooling of the vehicle seat 5 is required, the controller 30 or 90 may operate in the third mode (S29). In the third mode, only the cooling of the vehicle seat 5 may be performed.

When the second target temperature is not lower than the room temperature in S28, that is, the second target temperature is higher than or equal to the room temperature, indicating that the heating of the vehicle seat 5 is required, the controller 30 or 90 may operate in the sixth mode (S34).

When the first target temperature is not lower than the room temperature in S22, that is, the first target temperature is higher than or equal to the room temperature, the controller 30 or 90 may determine whether or not the second target temperature has been set (S30) in a state in which it determines that the heating of the air conditioning unit 10 or 60 is required.

When the second target temperature has not been set in S30, indicating that the cooling and heating of the vehicle seat 5 are not required (that is, the vehicle seat 5 is not in operation), the controller 30 or 90 may operate in the fourth mode (S31). In the fourth mode, only the heating of the air conditioning unit 10 or 60 may be performed.

When the second target temperature has been set in S30, the controller 30 or 90 may determine whether or not the second target temperature is lower than the room temperature (S32).

When the second target temperature is not lower than the room temperature in S32, that is, the second target temperature is higher than or equal to the room temperature, indicating that the heating of the vehicle seat 5 is required, the controller 30 or 90 may operate in the fifth mode (S33). In the fifth mode, the heating of the air conditioning unit 10 or 60 and the heating of the vehicle seat 5 may be performed together.

When the first target temperature has not been set in S21, and the second target temperature has not been set in S27, indicating that neither cooling nor heating of the air conditioning unit 10 or 60 and the vehicle seat 5 is required, the refrigerant may stop circulating in the air conditioning unit 10 or 60 and the seat coil 20 or 80 (S35).

When the second target temperature is not lower than the room temperature in S24, the heating of the vehicle seat 5 may be required, and the cooling of the air conditioning unit 10 or 60 may be required. This may result in inefficient energy waste, and thus a warning message "energy inefficiency" may be displayed on the user interface 40 or 95 or a warning sound may be given (S36).

In addition, when the second target temperature is lower than the room temperature in S32, the cooling of the vehicle seat 5 may be required, and the heating of the air conditioning unit 10 or 60 may be required. This may result in inefficient energy waste, and thus a warning message "energy inefficiency" may be displayed on the user interface 40 or 95 or a warning sound may be given (S36).

According to the above-described exemplary embodiments of the present disclosure, by providing efficient thermal management with respect to the passenger compartment and the vehicle seats, the occupant's desired optimum temperature may be easily adjusted and the energy of the vehicle may be efficiently managed.

As set forth above, the vehicle climate control system and the method for controlling the same, according to exemplary embodiments of the present disclosure, may provide efficient thermal management with respect to the passenger compartment and the vehicle seats, thereby allowing the occupant to easily adjust a desired optimum temperature and efficiently managing the vehicle's energy.

In particular, by adjusting the power of the compressor on the basis of the calculation results obtained after separately calculating the heat quantity required for the passenger compartment and the heat quantity required for the vehicle seat, unnecessary power consumption of the compressor may be prevented, and thus fuel efficiency/energy efficiency may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle climate control system, comprising:
an air conditioning unit including an exterior heat exchanger, an interior heat exchanger, an evaporator, a compressor, a first expansion valve, and a second expansion valve; and a seat coil embedded in a vehicle seat and connected to the air conditioning unit through a first inlet passage, a first outlet passage, a second inlet passage, and a second outlet passage;

wherein the compressor is selectively connected to the exterior heat exchanger, the evaporator, the interior heat exchanger, and the seat coil;

wherein the first expansion valve is selectively connected to an outlet of the exterior heat exchanger, an inlet of the evaporator, and the seat coil; and wherein the second expansion valve is selectively connected to an outlet of the interior heat exchanger, an inlet of the exterior heat exchanger, and the seat coil.

2. The system according to claim 1, wherein the compressor includes a first inlet selectively connected to the outlet of the exterior heat exchanger and the seat coil, a second inlet connected to an outlet of the evaporator, and an outlet selectively connected to an inlet of the interior heat exchanger and the seat coil.

3. The system according to claim 2, further comprising:
a first three-way valve selectively connecting the outlet of the exterior heat exchanger, the first inlet of the compressor, and the first expansion valve;
a second three-way valve selectively connecting the first expansion valve, the inlet of the evaporator, and the seat coil;
a third three-way valve selectively connecting the outlet of the compressor, the inlet of the interior heat exchanger, and the seat coil; and
a fourth three-way valve selectively connecting the outlet of the interior heat exchanger, the seat coil, the inlet of the exterior heat exchanger, and the second expansion valve.

4. The system according to claim 2, wherein:
the first inlet passage allows a refrigerant to flow from the outlet of the exterior heat exchanger to the seat coil;
the first outlet passage allows the refrigerant to flow from the seat coil to the first inlet of the compressor;
the second inlet passage allows the refrigerant to flow from the outlet of the compressor to the seat coil; and
the second outlet passage allows the refrigerant to flow from the seat coil to the inlet of the exterior heat exchanger.

5. The system according to claim 1, wherein:
the seat coil includes a first seat coil embedded in a seat cushion of the vehicle seat, and a second seat coil embedded in a seat back of the vehicle seat; and
the first seat coil and the second seat coil are fluidly connected to each other.

* * * * *